United States Patent
Komura et al.

(10) Patent No.: US 12,485,593 B2
(45) Date of Patent: Dec. 2, 2025

(54) METHOD FOR FORMING IN-MOLD COATING MULTI-LAYER COATING FILM

(71) Applicant: KANSAI PAINT CO., LTD., Hyogo (JP)

(72) Inventors: Katsuto Komura, Kanagawa (JP); Haruka Nakaoka, Kanagawa (JP); Takashi Kitamura, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

(21) Appl. No.: 18/690,152

(22) PCT Filed: Oct. 26, 2022

(86) PCT No.: PCT/JP2022/039999
§ 371 (c)(1),
(2) Date: Mar. 7, 2024

(87) PCT Pub. No.: WO2023/085097
PCT Pub. Date: May 19, 2023

(65) Prior Publication Data
US 2025/0144859 A1    May 8, 2025

(30) Foreign Application Priority Data

Nov. 10, 2021    (JP) ................................ 2021-183614

(51) Int. Cl.
*B29C 45/16*     (2006.01)
*B29K 25/00*     (2006.01)
*B29K 623/00*    (2006.01)
*B29K 655/02*    (2006.01)

(52) U.S. Cl.
CPC ...... *B29C 45/1679* (2013.01); *B29K 2025/06* (2013.01); *B29K 2623/12* (2013.01); *B29K 2655/02* (2013.01)

(58) Field of Classification Search
CPC ................................................ B29C 45/1679
See application file for complete search history.

(56) References Cited

U.S. PATENT DOCUMENTS

| | | | | |
|---|---|---|---|---|
| 4,076,788 A | * | 2/1978 | Ditto | B29C 37/0028 264/246 |
| 4,081,578 A | * | 3/1978 | van Essen | C08G 18/10 264/296 |
| 6,890,469 B2 | * | 5/2005 | Straus | B29C 45/1679 264/328.8 |
| 7,862,758 B2 | * | 1/2011 | Okahara | B29C 45/561 264/328.7 |
| 8,047,827 B2 | * | 11/2011 | Okahara | B29C 45/1679 264/328.8 |
| 2018/0050507 A1 | | 2/2018 | Aiiso | |

FOREIGN PATENT DOCUMENTS

| | | | | |
|---|---|---|---|---|
| JP | S4885655 A | | 11/1973 | |
| JP | H04-270618 A | | 9/1992 | |
| JP | H11-151767 A | | 6/1999 | |
| JP | 2013-184307 A | | 9/2013 | |
| JP | 2016-168720 A | | 9/2016 | |
| JP | 2017-121743 A | | 7/2017 | |
| WO | WO0053651 | * | 9/2000 | |
| WO | WO-0053651 A1 | * | 9/2000 | ......... C08G 18/0823 |
| WO | WO-2004/035697 A1 | | 4/2004 | |

OTHER PUBLICATIONS

International Search Report, corresponding International Application No. PCT/JP2022/039999, mailing date Dec. 6, 2022.

* cited by examiner

*Primary Examiner* — Edmund H Lee
(74) *Attorney, Agent, or Firm* — MARSHALL, GERSTEIN & BORUN LLP

(57) ABSTRACT

A method for forming an in-mold coating multi-layer coating film includes: forming an uncured first in-mold coating film by injecting a specific first in-mold coating material composition (X) between a molded base material and an inner wall of a first film coating mold; heating and curing the uncured first in-mold coating film; separating the first film coating mold from a surface of the cured first in-mold coating film; providing a gap between the surface of the cured first in-mold coating film and a second film coating mold; forming an uncured second in-mold coating film by injecting a specific second in-mold coating material composition (Y) between the surface of the cured first in-mold coating film and an inner wall of the second film coating mold; and heating and curing the uncured second in-mold coating film.

7 Claims, No Drawings

METHOD FOR FORMING IN-MOLD COATING MULTI-LAYER COATING FILM

TECHNICAL FIELD

The present invention relates to a method of forming an in-mold coated multi-layer coating film.

BACKGROUND ART

In recent years, plastic materials have been used as alternative materials of metals in automobile parts, and coatings have been applied to molded members. An in-mold coating method is attracting attention as a molding and coating method with a reduced number of steps and less burden on the environment. In the in-mold coating method, a coating composition is injected into a gap provided between a mold surface and a surface of a plastic molded body molded in the mold, and then the coating composition is cured in the mold to produce an integrated molded body in which the coating film closely adheres to the molded product surface.

When a plurality of layers are to be formed in the in-mold coating method, generally, the first layer is semi-cured or cured and then the next layer is injected into the mold. However, in order to facilitate adjustments of the degree of curing and to ensure mold releasability when a gap is provided between the first layer and the mold, an in-mold coating method involving curing of the first layer has been desired.

JP 2013-184307 A discloses an in-mold coating method that includes a step in which a fiber-reinforced plastic material is heated and molded in a mold, next an in-mold coating composition is injected between the resultant molded article and the inner wall of the mold, and the in-mold coating composition is cured, after which the coated molded article is removed from the mold, characterized in that a matrix resin used in the fiber-reinforced plastic material is an epoxy resin, and the in-mold coating composition contains (A) at least one resin selected from a polymerizable unsaturated group-containing urethane resin, a polymerizable unsaturated group-containing epoxy resin, and a polymerizable unsaturated group-containing polyester resin and having a weight average molecular weight of 3000 to 80000, (B) a specific di(meth)acrylate having a molecular weight of 156 to 280, (C) a compound having one or more hydroxyl groups and two or more (meth)acryloyl groups per molecule, and (D) an organic peroxide, and based on 100 parts by mass of the total solid content of the components (A), (B), and (C), the solid content of the component (A) is from 5 to 80 parts by mass, the solid content of the component (B) is from 10 to 85 parts by mass, the solid content of the component (C) is from 1 to 10 parts by mass, and the solid content of the component (D) is from 0.1 to 5 parts by mass. According to this patent document, the in-mold coating method can form an in-mold coating film having excellent adhesion to a fiber-reinforced plastic material in which an epoxy resin is used as a matrix resin and excellent finishing properties, and also having excellent adhesion to a subsequently formed colored coating film and excellent water resistance.

The in-mold coating film described in JP 2013-184307 A has excellent adhesion to a fiber-reinforced plastic material and excellent adhesion to a subsequently formed colored coating film. However, in order to form a multi-layer coating film, an upper layer of a colored coating film must be formed by spray coating after in-mold coating, and thus this in-mold coating film poses a problem in that the burden on the environment is increased.

SUMMARY OF INVENTION

Therefore, an object of the present invention is to provide a method of forming an in-mold coated multi-layer coating film, the method being capable of forming an in-mold coated multi-layer coating film having excellent interlayer adhesion between a first in-mold coating film and a second in-mold coating film with reduced burden on the environment.

As a result of extensive studies, the present inventors have found that the above object can be achieved by a method of forming an in-mold coated multi-layer coating film, the method including: step (1): forming an uncured first in-mold coating film by injecting a first in-mold coating composition (X) between a molded base material and an inner wall of a first film-coating-mold, the first in-mold coating composition (X) containing a polymerizable unsaturated group-containing compound (x1) containing a polymerizable unsaturated group, and a compound (x2) containing a first reactive functional group other than a polymerizable unsaturated group and containing no polymerizable unsaturated group; step (2): heating the uncured first in-mold coating film to thereby cure the uncured first in-mold coating film and form a cured first in-mold coating film; step (3): separating the first film-coating-mold from a surface of the cured first in-mold coating film; step (4): providing a gap between the surface of the cured first in-mold coating film and a second film-coating-mold; step (5): forming an uncured second in-mold coating film by injecting a second in-mold coating composition (Y) between the surface of the cured first in-mold coating film and an inner wall of the second film-coating-mold, the second in-mold coating composition (Y) containing a compound (y1) containing a second reactive functional group capable of reacting with the first reactive functional group; and step (6): heating and curing the uncured second in-mold coating film, wherein the second film-coating-mold is the same as or different from the first film-coating-mold.

That is, the present invention relates to the following aspects <1> to <7>.

<1> A method of forming an in-mold coated multi-layer coating film, the method comprising:

step (1): forming an uncured first in-mold coating film by injecting a first in-mold coating composition (X) between a molded base material and an inner wall of a first film-coating-mold, the first in-mold coating composition (X) containing a polymerizable unsaturated group-containing compound (x1) containing a polymerizable unsaturated group, and a compound (x2) containing a first reactive functional group other than a polymerizable unsaturated group and containing no polymerizable unsaturated group;

step (2): heating the uncured first in-mold coating film to thereby cure the uncured first in-mold coating film and form a cured first in-mold coating film;

step (3): separating the first film-coating-mold from a surface of the cured first in-mold coating film;

step (4): providing a gap between the surface of the cured first in-mold coating film and a second film-coating-mold;

step (5): forming an uncured second in-mold coating film by injecting a second in-mold coating composition (Y) between the surface of the cured first in-mold coating film and an inner wall of the second film-coating-mold, the second in-mold coating composition (Y) containing a compound (y1) containing a second reactive functional group capable of reacting with the first reactive functional group; and step (6): heating and curing the uncured second in-mold coating film, wherein the second film-coating-mold is the same as or different from the first film-coating-mold.

<2> The method of forming the in-mold coated multi-layer coating film according to <1>, wherein the polymerizable unsaturated group-containing compound (x1) contains a compound (x11) containing the polymerizable unsaturated group and the second reactive functional group.

<3> The method of forming the in-mold coated multi-layer coating film according to <1> or <2>, wherein the polymerizable unsaturated group-containing compound (x1) contains a vinyl aromatic compound (x12).

<4> The method of forming the in-mold coated multi-layer coating film according to <3>, wherein the polymerizable unsaturated group-containing compound (x1) contains the vinyl aromatic compound (x12) in an amount in a range from 20 to 91 mass % based on the content of the polymerizable unsaturated group-containing compound (x1).

<5> The method of forming the in-mold coated multi-layer coating film according to any one of <1> to <4>, wherein the first reactive functional group contains an isocyanate group.

<6> The method of forming the in-mold coated multi-layer coating film according to any one of <1> to <5>, wherein the second reactive functional group contains a hydroxyl group.

<7> The method of forming the in-mold coated multi-layer coating film according to any one of <1> to <6>, wherein the second in-mold coating composition (Y) contains a compound (y2) containing the first reactive functional group and containing no polymerizable unsaturated group.

According to the present invention, an in-mold coated multi-layer coating film having excellent interlayer adhesion between a first in-mold coating film and a second in-mold coating film with reduced burden on the environment can be formed.

DESCRIPTION OF EMBODIMENTS

The method of forming an in-mold coated multi-layer coating film of the present invention includes:

step (1): forming an uncured first in-mold coating film by injecting a first in-mold coating composition (X) between a molded base material and an inner wall of a first film-coating-mold, the first in-mold coating composition (X) containing a polymerizable unsaturated group-containing compound (x1) containing a polymerizable unsaturated group, and a compound (x2) containing a first reactive functional group other than a polymerizable unsaturated group and containing no polymerizable unsaturated group;

step (2): heating the uncured first in-mold coating film to thereby cure the uncured first in-mold coating film and form a cured first in-mold coating film;

step (3): separating the first film-coating-mold from a surface of the cured first in-mold coating film;

step (4): providing a gap between the surface of the cured first in-mold coating film and a second film-coating-mold;

step (5): forming an uncured second in-mold coating film by injecting a second in-mold coating composition (Y) between the surface of the cured first in-mold coating film and an inner wall of the second film-coating-mold, the second in-mold coating composition (Y) containing a compound (y1) containing a second reactive functional group capable of reacting with the first reactive functional group; and step (6): heating and curing the uncured second in-mold coating film, wherein the second film-coating-mold is the same as or different from the first film-coating-mold.

In the present specification, a "cured" state refers to a "cured and dried" state as defined in JIS K 5600-1-1, that is, a state in which when the center of a coating film is strongly held between the thumb and the index finger, no indentation is formed on the coating surface by fingerprints, and no movement of the coating film is felt, and when the center of the coating film is rapidly and repeatedly rubbed with a fingertip, no scratches are formed on the coating surface.

The in-mold coated multi-layer coating film formed by the method of forming an in-mold coated multi-layer coating film according to the present invention exhibits excellent interlayer adhesion between the first in-mold coating film and the second in-mold coating film, and the reason for this is presumed to be as follows.

When the first in-mold coating composition (X) containing the polymerizable unsaturated group-containing compound (x1) and the compound (x2), which contains a first reactive functional group other than a polymerizable unsaturated group and contains no polymerizable unsaturated group, is heated, the polymerizable unsaturated group of the polymerizable unsaturated group-containing compound (x1) are polymerized, whereby the first in-mold coating composition (X) is cured, and a cured first in-mold coating film is formed. In the cured first in-mold coating film, some or all of the first reactive functional groups of the compound (x2), which contains the first reactive functional group other than a polymerizable unsaturated group and contains no polymerizable unsaturated group, remain unreacted. When the second in-mold coating composition (Y), which contains a compound (y1) containing a second reactive functional group capable of reacting with the first reactive functional group, is injected into a gap between the surface of the cured first in-mold coating film and the inner wall of the second film-coating-mold and then heated and cured, some or all of the first reactive functional groups of the compound (x2), which contains the first reactive functional group other than a polymerizable unsaturated group and contains no polymerizable unsaturated group, can react with the second reactive functional groups of the compound (y1), which contains the second reactive functional group capable of reacting with the first reactive functional group. As a result, the first in-mold coating film and the second in-mold coating film are strongly bonded to each other, and thus it is presumed that an in-mold coated multi-layer coating film having excellent interlayer adhesion between the first in-mold coating film and the second in-mold coating film is formed.

[First Reactive Functional Group and Second Reactive Functional Group]

The first reactive functional group is a reactive functional group that can react with the second reactive functional group and is a reactive functional group other than a polymerizable unsaturated group.

The second reactive functional group is a reactive functional group other than a polymerizable unsaturated group and is a reactive functional group that can react with the first reactive functional group. The second reactive functional group is preferably a group that differs from the first reactive functional group.

Examples of combinations of the first reactive functional group and the second reactive functional group include, as first reactive functional group/second reactive functional group combinations, an epoxy group/carboxyl group combination, a carboxyl group/epoxy group combination, a hydroxyl group/isocyanate group combination, an isocyanate group/hydroxyl group combination, a hydroxyl group/alkoxysilyl group combination, an alkoxysilyl group/hydroxyl group combination, an amino group/isocyanate group combination, an isocyanate group/amino group combination, an epoxy group/amino group combination, and an amino group/epoxy group combination. Of these, preferably, at least one combination selected from an epoxy group/carboxyl group combination, a carboxyl group/epoxy group combination, a hydroxyl group/isocyanate group combination, an isocyanate group/hydroxyl group combination, an amino group/epoxy group combination, and an epoxy group/amino group combination is contained, more preferably, at least one combination selected from an isocyanate group/hydroxyl group combination and an epoxy group/amino group combination is contained, and even more preferably, an isocyanate group/hydroxyl group combination is contained.

That is, the below-described compound (x2), which contains the first reactive functional group other than a polymerizable unsaturated group and contains no polymerizable unsaturated group, preferably contains a compound containing an isocyanate group and containing no polymerizable unsaturated group, and the compound (y1), which contains the second reactive functional group, preferably contains a compound containing a hydroxyl group.

[Step (1)]

According to the method of forming an in-mold coated multi-layer coating film of the present invention, firstly, an uncured first in-mold coating film is formed by injecting a first in-mold coating composition (X) between a molded base material and an inner wall of a first film-coating-mold, the first in-mold coating composition (X) containing a polymerizable unsaturated group-containing compound (x1) and a compound (x2) containing a first reactive functional group other than a polymerizable unsaturated group and containing no polymerizable unsaturated group.

[Molded Base Material]

Examples of the molded base material include metals such as iron, zinc, aluminum, and magnesium, alloys containing these metals, molded articles plated or vapor-deposited with these metals, and molded articles made of glass, a resin material, and a foam. Among these, a molded article made of a resin material is preferably used as the base material. As necessary, such a material can be appropriately degreased or surface-treated and used as the base material.

Examples of the resin material include acrylic resins, such as polymethyl methacrylate; polyester resins, such as polyethylene terephthalate, polyethylene naphthalate, poly-1,4-cyclohexanedimethylene terephthalate, polyethylene-1,2-diphenoxyethane-4,4'-dicarboxylate, and polybutylene terephthalate; epoxy resins, including commercially available products, such as Epikote (trade name: available from Yuka Shell Epoxy Co., Ltd.); polycarbonate resins; polyimide resins; novolac resins; phenolic resins; acrylonitrile-butadiene-styrene (ABS) resins; acrylonitrile-ethylene-styrene (AES) resins; acrylonitrile-styrene-acrylate (ASA) resins; vinyl chloride resins; vinylidene chloride resin; polyurethane resins; cellulose ester resins (e.g., triacetylcellulose, diacetylcellulose, propionylcellulose, butyrylcellulose, acetylpropionylcellulose, and nitrocellulose); polyamide resins; polystyrene resins (e.g., syndiotactic polystyrene); polyolefin resins (e.g., polypropylene, polyethylene, and polymethylpentene); polysulfone resins; polyethersulfone resins; polyarylate resins; polyetherimide resins; polyetherketone resins; and various fiber reinforced plastics (which may be hereinafter abbreviated as FRP materials or simply as FRP).

[First In-Mold Coating Composition (X)]

The first in-mold coating composition (X) contains a polymerizable unsaturated group-containing compound (x1) and a compound (x2) having a first reactive functional group other than a polymerizable unsaturated group and having no polymerizable unsaturated group.

[Polymerizable Unsaturated Group-Containing Compound (x1)]

The polymerizable unsaturated group-containing compound (x1) is a compound having one or more polymerizable unsaturated groups per molecule. The polymerizable unsaturated group is an unsaturated group capable of radical polymerization, and specific examples include an acryloyl group, a methacryloyl group, a vinyl group, an allyl group, a propenyl group, an isopropenyl group, a maleimide group, and a vinyl ether group.

The polymerizable unsaturated group-containing compound (x1) preferably contains a compound (x11) containing a polymerizable unsaturated group and a second reactive functional group, from the viewpoint of interlayer adhesion between the first in-mold coating film and second in-mold coating film to be formed.

Examples of the compound (x11) containing a polymerizable unsaturated group and a second reactive functional group include a compound containing a polymerizable unsaturated group and a hydroxyl group, a compound containing a polymerizable unsaturated group and an amino group, a compound containing a polymerizable unsaturated group and a carboxyl group, a compound containing a polymerizable unsaturated group and an epoxy group, a compound containing a polymerizable unsaturated group and an isocyanate group, and a compound containing a polymerizable unsaturated group and an alkoxysilyl group. Of these, the compound (x11) is preferably at least one compound selected from a compound containing a polymerizable unsaturated group and a hydroxyl group, a compound containing a polymerizable unsaturated group and an amino group, a compound containing a polymerizable unsaturated group and a carboxyl group, a compound containing a polymerizable unsaturated group and an epoxy group, and a compound containing a polymerizable unsaturated group and an isocyanate group, is more preferably at least one compound selected from a compound containing a polymerizable unsaturated group and a hydroxyl group, and a compound containing a polymerizable unsaturated group and an amino group, and is even more preferably a compound containing a polymerizable unsaturated group and a hydroxyl group.

When such a compound is reactive with the first reactive functional group, the compound is included in the compound (x11) containing a polymerizable unsaturated group and a second reactive functional group, whereas when such a compound is not reactive with the first reactive functional group, the compound is not included in the compound (x11) containing a polymerizable unsaturated group and a second reactive functional group. For example, when the first reactive functional group is an isocyanate group, a compound containing a polymerizable unsaturated group and an epoxy group, a compound containing a polymerizable unsaturated group and a carboxyl group, and a compound containing a polymerizable unsaturated group and an alkoxysilyl group are not included in the compound (x11) containing a polymerizable unsaturated group and a second reactive functional group.

Next will be described specific examples of the compound containing a polymerizable unsaturated group and a hydroxyl group, the compound containing a polymerizable unsaturated group and an amino group, the compound containing a polymerizable unsaturated group and a carboxyl group, the compound containing a polymerizable unsaturated group and an epoxy group, the compound containing a polymerizable unsaturated group and an isocyanate group, and the compound containing a polymerizable unsaturated group and an alkoxysilyl group. The compounds containing a polymerizable unsaturated group and a plurality of types of reactive functional groups may be classified into a plurality of classes of the relevant compounds, and a compound of any of these classes can be used.

Examples of the compound containing a polymerizable unsaturated group and a hydroxyl group include monoesterified products of a (meth)acrylic acid and a dihydric alcohol having from 2 to 8 carbons, such as 2-hydroxyethyl (meth)acrylate, 2-hydroxypropyl (meth)acrylate, 3-hydroxypropyl (meth)acrylate, and 4-hydroxybutyl (meth)acrylate; F-caprolactone modified products of these monoesterified products of a (meth)acrylic acid and a dihydric alcohol having from 2 to 8 carbons; N-hydroxymethyl (meth)acrylamide; allyl alcohols; and (meth)acrylates containing a polyoxyethylene chain having a hydroxyl group at the molecular terminal. These compounds may be used alone or in combination of two or more types.

In the present specification, "(meth)acrylate" means acrylate and/or methacrylate. "(Meth)acrylic acid" means acrylic acid and/or methacrylic acid. In addition, "(meth)acryloyl" means acryloyl and/or methacryloyl. Furthermore, "(meth)acrylamide" means acrylamide and/or methacrylamide.

Examples of the compound containing a polymerizable unsaturated group and an amino group include (meth)acrylamide, N,N-dimethylaminopropyl (meth)acrylamide, methylene bis(meth)acrylamide, ethylene bis(meth)acrylamide, N-hydroxymethyl (meth)acrylamide, and an adduct of glycidyl (meth)acrylate and an amine compound. These compounds may be used alone or in combination of two or more types.

Examples of the compound containing a polymerizable unsaturated group and a carboxyl group include (meth) acrylic acid, maleic acid, crotonic acid, and β-carboxyethyl (meth)acrylate. These compounds may be used alone or in a combination of two or more types.

Examples of the compound containing a polymerizable unsaturated group and an epoxy group include glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth) acrylate, and allyl glycidyl ether. These compounds may be used alone or in a combination of two or more types.

Examples of the compound containing a polymerizable unsaturated group and an isocyanate group include isocyanatomethyl (meth)acrylate, isocyanatoethyl (meth)acrylate, isocyanatopropyl (meth)acrylate, isocyanatobutyl (meth) acrylate, isocyanatooctyl (meth)acrylate, p-methacryloxy-α,α'-dimethylbenzyl isocyanate, m-acryloxy-α,α'-dimethylbenzyl isocyanate, m- or p-isopropenyl-α,α'-dimethylbenzyl isocyanate, 1,1-bis((meth)acryloyloxymethyl)ethyl isocyanate, and a reaction product of 1 mol of hydroxyalkyl (meth)acrylate and 1 mol of a diisocyanate compound, specifically, for example, a compound obtained through an equimolar addition reaction between a compound having two isocyanate groups (of different reactivities) such as isophorone diisocyanate, and a compound having a polymerizable unsaturated group and a hydroxyl group, such as 2-hydroxyethyl (meth)acrylate or 4-hydroxybutyl (meth)acrylate. These compounds may be used alone or in combination of two or more types.

Examples of the compound containing a polymerizable unsaturated group and an alkoxysilyl group include vinyltrimethoxysilane, vinyltriethoxysilane, vinyltris(2-methoxyethoxy)silane, γ-(meth)acryloyloxypropyltrimethoxysilane, and γ-(meth)acryloyloxypropyltriethoxysilane. These compounds may be used alone or in combination of two or more types.

When the polymerizable unsaturated group-containing compound (x1) contains the compound (x11) containing a polymerizable unsaturated group and a second reactive functional group, the content of the compound (x11) containing a polymerizable unsaturated group and a second reactive functional group is preferably in a range from 1 to 60 mass %, more preferably in a range from 2 to 40 mass %, and even more preferably in a range from 5 to 20 mass %, based on the content of the polymerizable unsaturated group-containing compound (x1), from the viewpoints of interlayer adhesion between the first in-mold coating film and second in-mold coating film to be formed, adhesion between the first in-mold coating film to be formed and the base material, and weather resistance.

The polymerizable unsaturated group-containing compound (x1) preferably contains a vinyl aromatic compound (x12) from the viewpoint of adhesion between the first in-mold coating film to be formed and the base material.

Examples of the vinyl aromatic compound (x12) include styrene, α-methylstyrene, vinyltoluene, and α-chlorostyrene. These compounds may be used alone or in combination of two or more types. From the viewpoint of adhesion between the first in-mold coating film to be formed and the base material, the vinyl aromatic compound (x12) preferably contains styrene.

When the polymerizable unsaturated group-containing compound (x1) contains the vinyl aromatic compound (x12), the content of the vinyl aromatic compound (x12) is preferably in a range from 20 to 91 mass %, more preferably in a range from 25 to 75 mass %, and even more preferably in a range from 30 to 65 mass % based on the content of the polymerizable unsaturated group-containing compound (x1), from viewpoint of adhesion between the first in-mold coating film to be formed and the base material.

The polymerizable unsaturated group-containing compound (x1) may contain a "polymerizable unsaturated compound (x13) other than the vinyl aromatic compound (x12) and the compound (x11) containing a polymerizable unsaturated group and a second reactive functional group".

The "polymerizable unsaturated compound (x13) other than the vinyl aromatic compound (x12) and the compound (x11) containing a polymerizable unsaturated group and a second reactive functional group" may be, for example, any of the following polymerizable unsaturated compounds (i) to (xv). When a compound exemplified regarding the above-described compound (x11) containing a polymerizable unsaturated group and a second reactive functional group is not reactive with the first reactive functional group, the compound exemplified regarding the compound (x11) containing a polymerizable unsaturated group and a second reactive functional group may be used as the "polymerizable unsaturated compound (x13) other than the vinyl aromatic compound (x12) and the compound (x11) containing a polymerizable unsaturated group and a second reactive functional group". These polymerizable unsaturated compounds may be used alone or in combination of two or more types.

When a compound exemplified regarding the above-described compound (x11) containing a polymerizable unsaturated group and a second reactive functional group is reactive with the first reactive functional group, the exemplified compound is included in the compound (x11) containing a polymerizable unsaturated group and a second reactive functional group and is not included in the "polymerizable unsaturated compound (x13) other than the vinyl aromatic compound (x12) and the compound (x11) containing a polymerizable unsaturated group and a second reactive functional group". For example, when the first reactive functional group is an isocyanate group, a compound containing a polymerizable unsaturated group and a hydroxyl group and a compound containing a polymerizable unsaturated group and an amino group are not included in the "polymerizable unsaturated compound (x13) other than the vinyl aromatic compound (x12) and the compound (x11) containing a polymerizable unsaturated group and a second reactive functional group".

(i) Alkyl or cycloalkyl (meth)acrylates: for example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, and tricyclodecanyl (meth)acrylate.

(ii) Polymerizable unsaturated compounds having an isobornyl group: for example, isobornyl (meth)acrylate.

(iii) Polymerizable unsaturated compounds having an adamantyl group: for example, adamantyl (meth)acrylate.

(iv) Polymerizable unsaturated compounds having a tricyclodecenyl group: for example, tricyclodecenyl (meth)acrylate.

(v) Polymerizable unsaturated compounds having a fluorinated alkyl group: for example, perfluoroalkyl (meth)acrylates such as perfluorobutylethyl (meth)acrylate and perfluorooctylethyl (meth)acrylate; and fluoroolefins.

(vi) Polymerizable unsaturated compounds having a photopolymerizable functional group such as a maleimide group.

(vii) Vinyl compounds: for example, N-vinylpyrrolidone, ethylene, butadiene, chloroprene, vinyl propionate, and vinyl acetate.

(viii) Polymerizable unsaturated compounds having two or more polymerizable unsaturated groups per molecule: for example, allyl (meth)acrylate, ethylene glycol di(meth)acrylate, 1,4-butanediol di(meth)acrylate, neopentyl glycol di(meth)acrylate, 1,6-hexanediol di(meth)acrylate, dipropylene glycol di(meth)acrylate, triethylene glycol di(meth)acrylate, ethylene oxide-modified di(meth)acrylate of bisphenol A, propylene oxide-modified di(meth)acrylate of bisphenol A, ethylene oxide-modified di(meth)acrylate of bisphenol F, tricyclodecanedimethanol di(meth)acrylate, tricyclodecanediol di(meth)acrylate, pentaerythritol tetra(meth)acrylate, pentaerythritol tri(meth)acrylate, dipentaerythritol hexa(meth)acrylate, dipentaerythritol penta (meth)acrylate, trimethylolethane tri(meth)acrylate, trimethylolpropane tri(meth)acrylate, ditrimethylolpropane tetra(meth)acrylate, alkyl-modified products, caprolactone-modified products, and polyoxyalkylene-modified products of such (meth)acrylates, and urethane acrylates having two or more acrylate groups.

(ix) (Meth)acrylates having a polyoxyethylene chain having an alkoxy group at the molecular terminal.

(x) Polymerizable unsaturated compounds having a sulfonate group: for example, 2-acrylamido-2-methyl-propanesulfonic acid, 2-sulfoethyl (meth)acrylate, allylsulfonic acid, 4-styrenesulfonic acid, and sodium salts and ammonium salts of these sulfonic acids.

(xi) Polymerizable unsaturated compounds having a phosphate group: for example, acid phosphoxyethyl (meth)acrylate, acid phosphoxypropyl (meth)acrylate, acid phosphoxypoly(oxyethylene) glycol (meth)acrylate, and acid phosphoxypoly(oxypropylene) glycol (meth)acrylate.

(xii) Polymerizable unsaturated compounds having a UV-absorbing functional group: for example, 2-hydroxy-4-(3-methacryloyloxy-2-hydroxypropoxy)benzophenone, 2-hydroxy-4-(3-acryloyloxy-2-hydroxypropoxy) benzophenone, 2,2'-dihydroxy-4-(3-methacryloyloxy-2-hydroxypropoxy)benzophenone, 2,2'-dihydroxy-4-(3-acryloyloxy-2-hydroxypropoxy)benzophenone, and 2-(2'-hydroxy-5'-methacryloyloxyethylphenyl)-2H-benzotriazole.

(xiii) Photostable polymerizable unsaturated compounds: for example, 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, and 1-crotonoyl-4-crotonoyloxy-2,2,6,6-tetramethylpiperidine.

(xiv) Polymerizable unsaturated compounds having a carbonyl group: for example, acrolein, diacetone acrylamide, diacetone methacrylamide, acetoacetoxyethyl methacrylate, formylstyrol, and vinyl alkyl ketones having from 4 to 7 carbons (for example, vinyl methyl ketone, vinyl ethyl ketone, and vinyl butyl ketone).

(xv) Polymerizable unsaturated compounds having an acid anhydride group: for example, maleic anhydride, itaconic anhydride, and citraconic anhydride.

A polymerizable unsaturated compound (viii) having two or more polymerizable unsaturated groups per molecule is preferably contained as the "polymerizable unsaturated compound (x13) other than the vinyl aromatic compound (x12) and the compound (x11) containing a polymerizable unsaturated group and a second reactive functional group", from the viewpoint of the weather resistance of the in-mold coated multi-layer coating film to be formed.

When a polymerizable unsaturated compound (viii) having two or more polymerizable unsaturated groups per molecule is contained as the "polymerizable unsaturated compound (x13) other than the vinyl aromatic compound (x12) and the compound (x11) containing a polymerizable unsaturated group and a second reactive functional group", the content of the polymerizable unsaturated compound (viii) having two or more polymerizable unsaturated groups per molecule is preferably in a range from 5 to 60 mass %, more preferably in a range from 10 to 50 mass %, and even more preferably in a range from 15 to 40 mass % based on the content of the polymerizable unsaturated group-containing compound (x1), from the viewpoint of the weather resistance of the in-mold coated multi-layer coating film to be formed.

From the viewpoint of the adhesion between the first in-mold coating film to be formed and the base material, the content of the polymerizable unsaturated group-containing compound (x1) is preferably in a range from 45 to 95 mass %, more preferably in a range from 50 to 90 mass %, and even more preferably in a range from 65 to 85 mass %, based on the total amount of the first in-mold coating composition (X).

Compound (x2) Containing First Reactive Functional Group Other Than Polymerizable Unsaturated Group and Containing No Polymerizable Unsaturated Group Examples of the compound (x2) containing a first reactive functional group other than a polymerizable unsaturated group and containing no polymerizable unsaturated group include a compound containing an isocyanate group and containing no polymerizable unsaturated group, a compound containing an epoxy group and containing no polymerizable unsaturated group, a compound containing a hydroxyl group and containing no polymerizable unsaturated group, a compound containing a carboxyl group and containing no polymerizable unsaturated group, a compound containing an alkoxysilyl group and containing no polymerizable unsaturated group, and a compound containing an amino group and containing no polymerizable unsaturated group. Of these, at least one compound selected from a compound containing an isocyanate group and containing no polymerizable unsaturated group, a compound containing an epoxy group and containing no polymerizable unsaturated group, a compound containing a hydroxyl group and containing no polymerizable unsaturated group, a compound containing a carboxyl group and containing no polymerizable unsaturated group, and a compound containing an amino group and containing no polymerizable unsaturated group is preferably contained, at least one compound selected from a compound containing an isocyanate group and containing no polymerizable unsaturated group and a compound containing an epoxy group and containing no polymerizable unsaturated group is more preferably contained, and a compound containing an isocyanate group and containing no polymerizable unsaturated group is even more preferably contained.

When such a compound is reactive with the second reactive functional group, the compound is included in the above-described compound (x2) containing a first reactive functional group other than a polymerizable unsaturated group and containing no polymerizable unsaturated group, whereas when the compound is not reactive with the second reactive functional group, the compound is not included in the compound (x2) containing a first reactive functional group other than a polymerizable unsaturated group and containing no polymerizable unsaturated group. For example, when the second reactive functional group is a hydroxyl group, a compound containing a carboxyl group and containing no polymerizable unsaturated group, a compound containing an epoxy group and containing no polymerizable unsaturated group, and a compound containing an amino group and containing no polymerizable unsaturated group are not included in the compound (x2) containing a first reactive functional group other than a polymerizable unsaturated group and containing no polymerizable unsaturated group.

Next will be described specific examples of the compound containing an isocyanate group and containing no polymerizable unsaturated group, the compound containing an epoxy group and containing no polymerizable unsaturated group, the compound containing a hydroxyl group and containing no polymerizable unsaturated group, the compound containing a carboxyl group and containing no polymerizable unsaturated group, the compound containing an alkoxysilyl group and containing no polymerizable unsaturated group, and the compound containing an amino group and containing no polymerizable unsaturated group. The compounds containing no polymerizable unsaturated group and containing a plurality of types of reactive functional groups may be classified into a plurality of classes of the relevant compounds, and a compound of any of these classes can be used.

Examples of the compound containing an isocyanate group and containing no polymerizable unsaturated group include aliphatic polyisocyanates, alicyclic polyisocyanates, aromatic-aliphatic polyisocyanates, aromatic polyisocyanates, and derivatives of these polyisocyanates.

Examples of the aliphatic polyisocyanates include aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and methyl 2,6-diisocyanatohexanoate (trivial name: lysine diisocyanate); and aliphatic triisocyanates, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane.

Examples of the alicyclic polyisocyanates include alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (trivial name: isophorone diisocyanate), methyl-2,4-cyclohexane diisocyanate, methyl-2,6-cyclohexane diisocyanate, 1,3- or 1,4-bis(isocyanatomethyl)cyclohexane (trivial name: hydrogenated xylylene diisocyanate) or a mixture thereof, and norbornane diisocyanate; and alicyclic triisocyanates, such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)-heptane, and 6-(2-isocyanatoethyl)-2-isocyanatomethyl-2-(3-isocyanatopropyl)-bicyclo(2.2.1)heptane.

Examples of the aromatic-aliphatic polyisocyanates include aromatic-aliphatic diisocyanates, such as 1,3- or 1,4-xylylene diisocyanate or a mixture thereof, ω,ω'-diisocyanato-1,4-diethylbenzene, and 1,3- or 1,4-bis(1-isocyanato-1-methylethyl)benzene (trivial name: tetramethylxylylene diisocyanate) or a mixture thereof; and aromatic-aliphatic triisocyanates, such as 1,3,5-triisocyanatomethylbenzene.

Examples of the aromatic polyisocyanates include aromatic diisocyanates, such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or a mixture thereof, 2,4- or 2,6-tolylene diisocyanate or a mixture thereof, 4,4'-toluidine diisocyanate, and 4,4'-diphenyl ether diisocyanate; aromatic triisocyanates, such as triphenylmethane-4,4',4"-triisocyanate, 1,3,5-triisocyanatobenzene, and 2,4,6-triisocyanatotoluene; and aromatic tetraisocyanates, such as 4,4'-diphenylmethane-2,2',5,5'-tetraisocyanate.

Examples of the derivatives of the above-mentioned polyisocyanates include dimers, trimers, biurets, allophanates, uretdiones, uretoimines, isocyanurates, oxadiazinetriones, polymethylene polyphenyl polyisocyanates (crude MDI and polymeric MDI), and crude TDI of the polyisocyanate compounds described above.

The polyisocyanates and their derivatives may be used alone or in combination of two or more types. Among these polyisocyanates, aliphatic diisocyanates, alicyclic diisocyanates, and the derivatives thereof are suitably used alone or in combination of two or more types.

The compound containing an isocyanate group and containing no polymerizable unsaturated group may be a prepolymer formed by reacting, under a condition of excess isocyanate groups, the above-mentioned polyisocyanate or a derivative thereof with a compound capable of reacting with the polyisocyanate. Examples of the compound capable of reacting with the polyisocyanate include a compound having an active hydrogen group such as a hydroxyl group or an amino group, and specifically, for example, polyhydric alcohols, low molecular weight polyester resins, amines, and water can be used.

Examples of the compound containing an epoxy group and containing no polymerizable unsaturated group include a reaction product of a polyphenol compound and an epihalohydrin (for example, epichlorohydrin); a reaction product of a polyphenol compound and a diglycidyl ether compound; and epoxy group-containing alkoxysilane compounds such as γ-glycidoxypropyltrimethoxysilane, γ-glycidoxypropyltriethoxysilane, γ-glycidoxypropylmethyldimethoxysilane, and γ-glycidoxypropylmethyldiethoxysilane.

Examples of the above-mentioned polyphenol compound include 2,2-bis(4-hydroxyphenyl)propane (trivial name: bisphenol A), a mixture of 2,2'-, 2,4'-, and 4,4'-methylenediphenol (trivial name: bisphenol F), 1,1-bis(4-hydroxyphenyl)-1-phenylethane (trivial name: bisphenol AP), 2,2-bis(4-hydroxyphenyl)butane (trivial name: bisphenol B), 2,2-bis(3-methyl-4-hydroxyphenyl)propane (trivial name: bisphenol C), 1,1-bis(4-hydroxyphenyl)ethane (trivial name: bisphenol E), phenol novolac, and cresol novolac. Among these, 2,2-bis(4-hydroxyphenyl)propane (trivial name: bisphenol A) is preferably used as the polyphenol compound from the viewpoint of adhesion to the base material.

Examples of commercially available products of the compound containing an epoxy group and containing no polymerizable unsaturated group include "jER828", "jER828EL", "jER1002", "jER1004", "jER1007", and "jER834X90" (all available from Mitsubishi Chemical Corporation).

Examples of the compound containing a hydroxyl group and containing no polymerizable unsaturated group include high molecular weight compounds such as a hydroxyl group-containing polyester resin, a hydroxyl group-containing acrylic resin, a hydroxyl group-containing acrylic-modified polyester resin, a hydroxyl group-containing polyurethane resin, a hydroxyl group-containing polyether resin, a hydroxyl group-containing polycarbonate resin, a hydroxyl group-containing epoxy resin, and a hydroxyl group-containing alkyd resin. Among these, a hydroxyl group-containing polyester resin is preferably contained from the viewpoint of interlayer adhesion between the first in-mold coating film and second in-mold coating film to be formed. These compounds may be used alone or in combination of two or more types.

The hydroxyl group-containing polyester resin can be generally produced by esterification reaction or transesterification reaction between an acid component and an alcohol component.

The acid component may be a compound commonly used as a polycarboxylic acid in the production of the above-mentioned hydroxyl group-containing polyester resin. Examples of such a polycarboxylic acid include an aliphatic polybasic acid, an alicyclic polybasic acid, and an aromatic polybasic acid.

The aliphatic polybasic acid is generally an aliphatic compound having two or more carboxyl groups per molecule, an acid anhydride of the aliphatic compound, or an esterified product of the aliphatic compound. Examples of the aliphatic polybasic acid include aliphatic polycarboxylic acids such as succinic acid, glutaric acid, adipic acid, pimelic acid, suberic acid, azelaic acid, sebacic acid, undecanedioic acid, dodecanedioic acid, brassylic acid, octadecanedioic acid, citric acid, and butanetetracarboxylic acid; anhydrides of the aliphatic polycarboxylic acids; and esterified products of lower alkyls having from 1 to 6 carbons, preferably from 1 to 4 carbons, of the aliphatic polycarboxylic acids. The aliphatic polybasic acids may be used alone or in combination of two or more types.

The alicyclic polybasic acid is generally a compound having one or more alicyclic structures and two or more carboxyl groups per molecule, an acid anhydride of the compound, or an esterified product of the compound. The alicyclic structure may be generally a four- to six-membered ring structure. Examples of the alicyclic polybasic acid include alicyclic polycarboxylic acids such as 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexanetricarboxylic acid, and 1,3,5-cyclohexanetricarboxylic acid; anhydrides of the alicyclic polycarboxylic acids; and esterified products of lower alkyls having from 1 to 6 carbons, preferably 1 to 4 carbons, of the alicyclic polycarboxylic acids. The alicyclic polybasic acids may be used alone or in combination of two or more types.

The aromatic polybasic acid is generally an aromatic compound having two or more carboxyl groups per molecule, an acid anhydride of the aromatic compound, or an esterified product of the aromatic compound. Examples of the aromatic polybasic acid include aromatic polycarboxylic acids, such as phthalic acid, isophthalic acid, terephthalic acid, naphthalenedicarboxylic acid, 4,4'-biphenyldicarboxylic acid, trimellitic acid, and pyromellitic acid; anhydrides of the aromatic polycarboxylic acids; and esterified products of lower alkyls having from 1 to 6 carbons, preferably, from 1 to 4 carbons, of the aromatic polycarboxylic acids. The aromatic polybasic acids may be used alone or in combination of two or more types.

In addition, an acid component other than the aliphatic polybasic acid, the alicyclic polybasic acid, and the aromatic polybasic acid may be used. Such an acid component is not particularly limited, and examples thereof include fatty acids, such as coconut oil fatty acid, cotton seed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, and safflower oil fatty acid; monocarboxylic acids such as lauric acid, myristic acid, palmitic acid, stearic acid, oleic acid, linoleic acid, linolenic acid, benzoic acid, p-tert-butylbenzoic acid, cyclohexanoic acid, and 10-phenyloctadecanoic acid; and hydroxycarboxylic acids such as lactic acid, 3-hydroxybutanoic acid, and 3-hydroxy-4-ethoxybenzoic acid. These acid components may be used alone or in combination of two or more types.

As the alcohol component, a polyhydric alcohol having two or more hydroxyl groups per molecule can be suitably used. Examples of the polyhydric alcohols include dihydric alcohols, such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 2-methyl-1,3-propanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, neopentyl glycol hydroxypivalate ester, hydrogenated bisphenol A, hydrogenated bisphenol F, and dimethylolpropionic acid; polylactone diols produced by adding a lactone compound such as F-caprolactone to these dihydric alcohols; ester diol compounds such as bis(hydroxyethyl) terephthalate; polyether diol compounds such as an alkylene oxide adduct of bisphenol A, polyethylene glycol, polypropylene glycol, and polybutylene glycol; tri- or higher-hydric alcohols, such as glycerin, trimethylolethane, trimethylolpropane, diglycerin, triglycerin, 1,2,6-hexanetriol, pentaerythritol, dipentaerythritol, tris(2-hydroxyethyl)isocyanuric acid, sorbitol, and mannitol; polylactone polyol compounds produced by adding a lactone compound such as F-caprolactone to these tri- or higher-hydric alcohols; and fatty acid ester compounds of glycerin.

Furthermore, an alcohol component other than the polyols described above can be used. Such an alcohol component is not particularly limited, and examples thereof include monoalcohols such as methanol, ethanol, propyl alcohol, butyl alcohol, stearyl alcohol, and 2-phenoxyethanol; and alcohol compounds produced by reacting an acid with a monoepoxy compound such as a propylene oxide, butylene oxide, or "Cardura E10P" (trade name, glycidyl ester of a synthetic highly-branched saturated fatty acid, available from Hexion Inc.).

The method for producing a hydroxyl group-containing polyester resin is not particularly limited, and the hydroxyl group-containing polyester resin can be produced according to a typical method. For example, the hydroxyl group-containing polyester resin can be produced by a method in which the acid component and the alcohol component are heated at approximately 150 to 250° C. in a nitrogen stream for approximately 5 to 10 hours, and the acid component and the alcohol component are subjected to esterification reaction or transesterification reaction.

When the acid component and the alcohol component are to be subjected to esterification reaction or transesterification reaction, these components may be added all at once into a reaction vessel, or one or both components may be added in multiple batches. Alternatively, the hydroxyl group-containing polyester resin may be synthesized first, and then an acid anhydride may be reacted with the resultant hydroxyl group-containing polyester resin to form a half-ester and to yield a carboxyl group- and hydroxyl group-containing polyester resin. Alternatively, a carboxyl group-containing polyester resin may be synthesized first, and then the alcohol component may be added thereto, to produce the hydroxyl group-containing polyester resin.

For the above-mentioned esterification or transesterification reaction, a catalyst known per se can be used as a catalyst for promoting the reaction. Examples of such catalysts include dibutyltin oxide, antimony trioxide, zinc acetate, manganese acetate, cobalt acetate, calcium acetate, lead acetate, tetrabutyl titanate, and tetraisopropyl titanate.

The hydroxyl group-containing polyester resin may be modified with a fatty acid, a monoepoxy compound, or a polyisocyanate compound during or after production of the resin.

Examples of the fatty acid include coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, and safflower oil fatty acid. As the monoepoxy compound, for example, "Cardura E10P" (trade name, glycidyl ester of a synthetic highly-branched saturated fatty acid, available from Hexion Inc.) can be suitably used.

Examples of the polyisocyanate compound include aliphatic diisocyanate compounds, such as lysine diisocyanate, hexamethylene diisocyanate, and trimethylhexane diisocyanate; alicyclic diisocyanate compounds, such as hydrogenated xylylene diisocyanate, isophorone diisocyanate, methylcyclohexane-2,4-diisocyanate, methylcyclohexane-2,6-diisocyanate, 4,4'-methylenebis(cyclohexyl isocyanate), and 1,3-(isocyanatomethyl)cyclohexane; aromatic diisocyanate compounds, such as tolylene diisocyanate, xylylene diisocyanate, and diphenylmethane diisocyanate; organic polyisocyanates themselves, such as tri- or higher-valent polyisocyanates such as lysine triisocyanate; adducts of each of these organic polyisocyanates with a polyhydric alcohol, a low molecular weight polyester resin, or water; and cyclized polymers (for example, isocyanurate) and biuret-type adducts of each of these organic polyisocyanates. These polyisocyanate compounds may be used alone or in combination of two or more types.

The above-described hydroxyl group-containing polyester resin generally has a hydroxyl value in a range of preferably from 1 to 600 mgKOH/g, particularly preferably from 100 to 550 mgKOH/g, and even more particularly preferably from 300 to 540 mgKOH/g, from the viewpoints of interlayer adhesion between the first in-mold coating film and second in-mold coating film to be formed, and adhesion between a base material and the first in-mold coating film to be formed.

The hydroxyl group-containing polyester resin generally has a number average molecular weight within a range from 100 to 10000, particularly preferably from 200 to 5000, and more particularly preferably from 250 to 2000 from the viewpoints of interlayer adhesion between the first in-mold coating film and second in-mold coating film to be formed and weather resistance of the in-mold coated multi-layer coating film to be formed.

The hydroxyl group-containing polyester resin has a glass transition temperature (Tg) in a range of generally from −80° C. to 5° C., particularly preferably from −70° C. to 3° C., and more particularly preferably from −60° C. to 0° C. from the viewpoints of interlayer adhesion between the first in-mold coating film and second in-mold coating film to be formed and weather resistance of the in-mold coated multilayer coating film to be formed.

In the present specification, the number average molecular weight and the weight average molecular weight of a substance whose chemical formula is clear are molecular weights calculated from the chemical formula.

Meanwhile, the number average molecular weight and the weight average molecular weight of a substance whose chemical formula is not clear are values calculated by converting the molecular weights into those of polystyrene using the retention time (retention capacity) of the substance measured using a gel permeation chromatograph (GPC) and the retention time (retention capacity) of standard polystyrene having a known molecular weight measured under the same conditions. Specifically, the measurement can be performed using "HLC-8120 GPC" (trade name, available from Tosoh Corporation) as the gel permeation chromatograph with four columns, namely "TSKgel G-4000HXL", "TSKgel G-3000HXL", "TSKgel G-2500HXL", and "TSKgel G-2000HXL" (trade names, all available from Tosoh Corporation), and using a differential refractometer as a detector, under conditions including tetrahydrofuran as a mobile phase, a measurement temperature of 40° C., and a flow rate of 1 mL/min.

The glass transition temperature can be measured as follows. A sample is placed into a measuring cup of a differential scanning calorimeter "DSC-50Q" (available from Shimadzu Corporation, trade name) for example, and vacuum-suctioned to completely remove the solvent, and then a change in heat quantity is measured in a range from −100° C. to 150° C. at a temperature increase rate of 3° C./min, and the change point of the initial baseline on the low-temperature side is defined as the static glass transition temperature.

As the above-mentioned compound containing a hydroxyl group and containing no polymerizable unsaturated group, examples of low molecular weight compounds include ethylene glycol, propylene glycol, diethylene glycol, triethylene glycol, 1,2-butylene glycol, 1,3-butylene glycol, 2,3-butylene glycol, 1,4-butylene glycol, 1,5-pentanediol, neopentyl glycol, 1,6-hexane glycol, 2,5-hexanediol, dipropylene glycol, 2,2,4-trimethyl-1,3-pentanediol, tricyclodecanedimethanol, 1,4-cyclohexanedimethanol, benzyl alcohol, 2-phenylethanol, 2-phenoxyethanol, naphthalen-1-ol, (1,3-benzoxol-5-yl)methanol, nonylphenol, dinonylphenol, nonylphenol ethoxylate, mono-styrenated phenol, di-styrenated phenol, and tri-styrenated phenol. These compounds may be used alone or in combination of two or more types.

When a low molecular weight compound is used as the compound containing a hydroxyl group and containing no polymerizable unsaturated group, the low molecular weight compound containing a hydroxyl group and containing no polymerizable unsaturated group preferably contains at least one aromatic ring structure, from the viewpoints of interlayer adhesion between the first and second in-mold coating films to be formed and adhesion between the first in-mold coating film to be formed and the base material.

Examples of the low molecular weight compound containing an aromatic ring structure and a hydroxyl group and containing no polymerizable unsaturated group include benzyl alcohol, 2-phenylethanol, 2-phenoxyethanol, naphthalen-1-ol, (1,3-benzoxol-5-yl)methanol, nonylphenol, dinonylphenol, nonylphenol ethoxylate, mono-styrenated phenol, di-styrenated phenol, and tri-styrenated phenol, and examples of commercially available products include "BPX-11", "BPX-33", and "BPX-55" (trade names, bisphenol A propylene oxide adducts available from ADEKA Corporation), "KUMANOX-3110" and "KUMANOX-3111" (trade names, styrenated phenols available from Kumho Petrochemical Co., Ltd.), "Antage SP" (trade name, styrenated phenol available from Kawaguchi Chemical Industry Co., Ltd.), and "NOVARES LA 300" (trade name, styrenated phenol available from Rutgers Germany GmbH).

Examples of the compound containing a carboxyl group and containing no polymerizable unsaturated group include resins such as a carboxyl group-containing polyester resin, a carboxyl group-containing acrylic resin, a carboxyl group-containing acrylic-modified polyester resin, and a carboxyl group-containing polyurethane resin. These compounds may be used alone or in combination of two or more types. The compound containing a carboxyl group and containing no polymerizable unsaturated group is preferably a carboxyl group-containing polyester resin from the viewpoints of curability and viscosity suppression of the resulting coating composition.

Examples of the compound containing an alkoxysilyl group and containing no polymerizable unsaturated group include N-β-(aminoethyl)-γ-aminopropyltrimethoxysilane, N-β-(aminoethyl)-γ-aminopropylmethyldimethoxysilane, γ-glycidoxypropyltrimethoxysilane, γ-glycidoxypropyltriethoxysilane, γ-glycidoxypropylmethyldimethoxysilane, γ-glycidoxypropylmethyldiethoxysilane, γ-mercaptopropyltrimethoxysilane, γ-mercaptopropylmethyldimethoxysilane, methyltrimethoxysilane, γ-chloropropyltrimethoxysilane, hexamethyldisilazane, γ-anilinopropyltrimethoxysilane, octadecyldimethyl[3-(trimethoxysilyl)propyl]ammonium chloride, and trimethylchlorosilane.

Examples of the compound containing an amino group and containing no polymerizable unsaturated group include an aspartic acid ester amine, N-β-(aminoethyl)-γ-aminopropyltrimethoxysilane, N-β-(aminoethyl)-γ-aminopropylmethyldimethoxysilane, and γ-anilinopropyltrimethoxysilane. Among these, an aspartic acid ester amine is preferred.

Examples of commercially available products of the aspartic acid ester amine include "Desmophen NH 1220", "Desmophen NH 1420", and "Desmophen NH 1520" (trade names, available from Covestro AG).

From the viewpoint of interlayer adhesion between the first in-mold coating film and second in-mold coating film to be formed, the content of the compound (x2) containing a first reactive functional group other than a polymerizable unsaturated group and containing no polymerizable unsaturated group is preferably in a range of from 3 to 55 mass %, more preferably in a range from 7 to 40 mass %, and even more preferably in a range from 10 to 35 mass %, based on the total amount of the first in-mold coating composition (X).

[Additional Component]

The first in-mold coating composition (X) of the present invention can further contain, in addition to the components described above, a polymerization initiator, an internal mold release agent, an ultraviolet absorber, and/or a light stabilizer. The first in-mold coating composition (X) can appropriately contain, as necessary, a crosslinking agent, a solvent (organic solvent, water), a pigment, a catalyst, an antioxidant, a surface conditioner, a defoamer, an emulsifier, a surfactant, an antifouling agent, a wetting agent, a thickener, a dye, or another additive component typically used in the field of coatings.

As the above-mentioned polymerization initiator, for example, a thermal polymerization initiator or a photopolymerization initiator can be used. Among these, a thermal polymerization initiator is preferably used as at least one of the polymerization initiators, since it enables formation of a coating film regardless of the shape of a base material. A thermal polymerization initiator and a photopolymerization initiator can also be used in combination as the polymerization initiator.

The thermal polymerization initiator is a compound that generates free radicals (also in the form of an intermediate) by heating; or a mixture of these compounds. Examples of the thermal polymerization initiator include organic peroxides, such as benzoyl peroxide, octanoyl peroxide, lauroyl peroxide, stearoyl peroxide, cumene hydroperoxide, tert-butyl peroxide, tert-butyl peroxylaurate, tert-butyl peroxybenzoate, tert-butyl peroxyisopropylcarbonate, tert-butyl peroxyacetate, and diisopropylbenzene hydroperoxide; azo compounds, such as azobisisobutyronitrile, azobis(2,4-dimethylvaleronitrile), azobis(2-methylpropionitrile), azobis(2-methylbutyronitrile), 4,4'-azobis(4-cyanobutanoic acid), dimethyl azobis(2-methylproprionate), azobis[2-methyl-N-(2-hydroxyethyl)-propionamide], and azobis{2-methyl-N-[2-(1-hydroxybutyl)]-propionamide}; and persulfate salts, such as potassium persulfate, ammonium persulfate, and sodium persulfate.

Examples of commercially available products of the thermal polymerization initiator include "VA-044", "VA-046B", "V-50", "VA-057", "VA-061", "VA-067", "VA-086", "V-60", "V-70", "V-65", "V-601", "V-59", "V-40", "VF-096", and "VAm-110" (trade names, all above available from Wako Pure Chemical Industries, Ltd.); and "PERBUTYL H", "PERBUTYL Z", "PERBUTYL O", and "PEROCTA O" (trade names, all above available from NOF Corporation).

The polymerization initiators may be used alone or in combination of two or more types.

When the first in-mold coating composition (X) of the present invention contains the polymerization initiator, the content of the polymerization initiator is preferably from 0.01 to 10 mass %, and more preferably from 0.1 to 5 mass %, based on the total amount of the first in-mold coating composition (X).

Examples of the internal mold release agent include saturated fatty acids such as stearic acid and palmitic acid; saturated fatty acid salts such as zinc stearate, aluminum stearate, magnesium stearate, calcium stearate, sodium stearate, potassium stearate, barium stearate, zinc palmitate, aluminum palmitate, magnesium palmitate, calcium palmitate, and sodium palmitate; fatty acid amides such as stearic acid amides and palmitic acid amides; unsaturated fatty acids such as palmitoleic acid and oleic acid; unsaturated fatty acid salts such as zinc palmitoleate, aluminum palmitoleate, magnesium palmitoleate, calcium palmitoleate, sodium palmitoleate, potassium palmitoleate, barium palmitoleate, zinc oleate, aluminum oleate, magnesium oleate, calcium oleate, sodium oleate, potassium oleate, and barium oleate; unsaturated fatty acid amides such as palmitoleic acid amides and oleic acid amides; nonionic surfactants such as polyoxyethylene alkyl ethers and sorbitan alkyl esters; fluorine-based compounds such as polytetrafluoroethylene, fluoropolyether, perfluoroalkyl esters, and perfluoroalkyl ester salts; phosphoric acid ester compounds such as phosphoric acid monoesters and/or phosphoric acid diesters having an alkyl chain or an oxyethylene chain; fatty acid esters such as stearic acid monoglyceride, stearic acid diglyceride, stearic acid triglyceride, stearic acid monosorbitate, stearyl stearate, palmitic acid monoglyceride, palmitic acid diglyceride, palmitic acid triglyceride, behenic acid monoglyceride, behenic acid diglyceride, behenic acid triglyceride, behenyl behenate, pentaerythritol monostearate, pentaerythritol tetrastearate, pentaerythritol tetrapelargonate, propylene glycol monostearate, stearyl stearate, palmityl palmitate, methyl stearate, butyl stearate, methyl laurate, methyl palmitate, isopropyl palmitate, biphenyl biphenate, sorbitan monostearate, and 2-ethylhexyl stearate; soybean oil lecithin, silicone oil, and fatty acid alcohol dibasic acid esters. These compounds may be used alone or in combination of two or more types.

The first in-mold coating film of the present invention preferably contains an internal mold release agent from the viewpoint of releasability between the first in-mold coating film and the mold.

From the viewpoints of adhesion between the first in-mold coating film to be formed and the base material, and releasability between the first in-mold coating film to be formed and the mold, the internal mold release agent preferably contains a fatty acid ester, more preferably contains a fatty acid ester composed of an alcohol and a higher fatty acid having 12 or more carbons, and even more preferably contains a fatty acid ester composed of an alcohol and a higher fatty acid having from 12 to 18 carbons.

A commercially available product can be used as the internal mold release agent containing a fatty acid ester composed of an alcohol and a higher fatty acid having from 12 to 18 carbons. Examples of the commercially available product include "BYK-P9065" (trade name, available from BYK-Chemie GmbH), "RIKEMAL TG-12" (trade name, available from Riken Vitamin Co., Ltd.), "INT-EQ6" (trade name, available from Axel Plastics Research Laboratories, Inc.), and "INT-120IMC" (trade name, available from Axel Plastics Research Laboratories, Inc.).

When the first in-mold coating composition (X) contains the internal mold release agent described above, the content of the internal mold release agent is preferably in a range from 0.1 to 10 mass %, more preferably in a range from 0.2 to 5 mass %, and even more preferably in a range from 0.3 to 3 mass %, based on the total amount of the first in-mold coating composition (X), from the viewpoints of adhesion between the first in-mold coating film to be formed and the base material, and releasability between the first in-mold coating film to be formed and the mold.

As the above-mentioned ultraviolet absorber, an ultraviolet absorber that has been known in the art can be used, and for example, a benzotriazole-based absorber, a triazine-based absorber, a salicylic acid derivative-based absorber, or a benzophenone-based absorber can be used. The ultraviolet absorber may have a polymerizable unsaturated group.

Specific examples of the benzotriazole-based absorber include 2-(2'-hydroxy-5'-methylphenyl)benzotriazole, 2-(2'-hydroxy-5'-t-butylphenyl)benzotriazole, 2-(2'-hydroxy-3', 5'-di-t-butylphenyl)benzotriazole, 2-(2'-hydroxy-3'-t-butyl-5'-methylphenyl)-5-chlorobenzotriazole, 2-(2'-hydroxy-3', 5'-di-t-butylphenyl)-5-chlorobenzotriazole, 2-(2'-hydroxy-3',5'-di-t-amylphenyl)benzotriazole, 2-(2'-hydroxy-4'-octoxyphenyl)benzotriazole, 2-{2'-hydroxy-3'-(3",4",5",6"-tetrahydrophthalimidomethyl)-5'-methylphenyl}benzotriazole, and 2-[2-hydroxy-5-[2-(methacryloyloxy)ethyl]phenyl]-2H-benzotriazole.

Specific examples of the triazine-based absorber include 2,4-bis(2,4-dimethylphenyl)-6-(2-hydroxy-4-isooctyloxyphenyl)-1,3,5-triazine, 2-[4((2-hydroxy-3-dodecyloxypropyl)-oxy)-2-hydroxyphenyl]-4,6-bis(2,4-dimethylphenyl)-1,3,5-triazine, 2-[4-((2-hydroxy-3-tridecyloxypropyl)-oxy)-2-hydroxyphenyl]-4,6-bis(2,4-dimethylphenyl)-1,3,5-triazine, and 2-(2,4-dihydroxyphenyl)-4,6-bis(2,4-dimethylphenyl)-1,3,5-triazine.

Specific examples of the salicylic acid derivative-based absorber include phenyl salicylate, p-octylphenyl salicylate, and 4-tert-butylphenyl salicylate.

Specific examples of the benzophenone-based absorber include 4-dihydroxybenzophenone, 2-hydroxy-4-methoxybenzophenone, 2,2'-dihydroxy-4-methoxybenzophenone, 2-hydroxy-4-methoxy-2'-carboxybenzophenone, 2-hydroxy-4-methoxy-5-sulfobenzophenone trihydrate, 2,2'-dihydroxy-4,4'-dimethoxybenzophenone, 2-hydroxy-4-octoxybenzophenone, 2-hydroxy-4-octadecyloxybenzophenone, sodium 2,2'-dihydroxy-4,4'-dimethoxy-5-sulfobenzophenone, 2,2',4,4'-tetrahydroxybenzophenone, 4-dodecyloxy-2-hydroxybenzophenone, 5-chloro-2-hydroxybenzophenone, resorcinol monobenzoate, 2,4-dibenzoylresorcinol, 4,6-dibenzoylresorcinol, hydroxydodecylbenzophenone, and 2,2'-dihydroxy-4(3-methacryloxy-2-hydroxypropoxy)benzophenone.

Examples of commercially available products of the ultraviolet absorber include "TINUVIN 900", "TINUVIN 928", "TINUVIN 384-2", "TINUVIN 479", "TINUVIN 405", and "TINUVIN 400", (available from BASF SE, trade name, TINUVIN is a registered trademark), and "RUVA 93" (available from Otsuka Chemical Co., Ltd., trade name).

When the first in-mold coating composition (X) contains the above-mentioned ultraviolet absorber, the content of the ultraviolet absorber is preferably in a range from 0.5 to 10 mass %, more preferably in a range from 0.8 to 9 mass %, and even more preferably in a range from 1.0 to 8 mass %, based on the total amount of the first in-mold coating composition (X).

The above-mentioned light stabilizer is used as a radical chain reaction inhibitor that traps an active radical species generated during the degradation process of a coating film, and examples include light stabilizers such as a hindered amine compound.

Examples of the hindered amine compound include hindered piperidine compounds of monomer type, such as bis(1,2,2,6,6-pentamethyl-4-piperidyl) sebacate, bis(2,2,6,6-tetramethyl-4-piperidinyl) sebacate, bis(N-methyl-2,2,6,6-tetramethyl-4-piperidinyl) sebacate, 4-benzoyloxy-2,2',6,6'-tetramethylpiperidine, and bis(1,2,2,6,6-pentamethyl-4-piperidyl){[3,5-bis(1,1-dimethylethyl)-4-hydroxyphenyl] methyl}butyl malonate; hindered piperidine compounds of oligomer type, such as poly{[6-(1,1,3,3-tetramethylbutyl) imino-1,3,5-triazine-2,4-diyl][(2,2,6,6-tetramethyl-4-piperidyl)imino]hexamethylene[(2,2,6,6-tetramethyl-4-piperidyl)iminol]}; and hindered piperidine compounds of polyester bond type, such as a polyesterified product of 4-hydroxy-2,2,6,6-tetramethyl-1-piperidineethanol and succinic acid.

Examples of commercially available products of the light stabilizer include "TINUVIN 123", "TINUVIN 152", and "TINUVIN 292" (available from BASF SE, trade names, TINUVIN is a registered trademark), "HOSTAVIN 3058" (available from Clariant AG, trade name, Hostavin is a registered trademark), and "ADK STAB LA-82" (available from ADEKA Corporation, trade name, ADK STAB is a registered trademark).

When the first in-mold coating composition (X) contains the above-mentioned light stabilizer, the content of the light stabilizer is preferably in a range from 0.5 to 10 mass %, more preferably in a range from 0.8 to 9 mass %, and even more preferably in a range from 1.0 to 8 mass %, based on the total amount of the first in-mold coating composition (X).

As the above-mentioned solvent, for example, an organic solvent or water can be used. Examples of the organic solvent include ketone solvents, such as acetone, methyl ethyl ketone, and methyl isobutyl ketone; ester solvents, such as ethyl acetate, butyl acetate, methyl benzoate, ethyl ethoxypropionate, ethyl propionate, and methyl propionate; ether solvents, such as tetrahydrofuran, dioxane, and dimethoxyethane; glycol ether solvents, such as ethylene glycol monomethyl ether, ethylene glycol monoethyl ether, diethylene glycol monomethyl ether, propylene glycol monomethyl ether acetate, and 3-methoxybutyl acetate; aromatic solvents, such as toluene, xylene, and "Swasol 1000" (trade name, a high boiling point petroleum-based solvent, available from Cosmo Oil Co., Ltd.); and aliphatic hydrocarbon solvents, such as hexane and heptane.

Examples of the pigment include effect pigments, color pigments, and extender pigments. The pigments may be used alone or in combination of two or more types.

Examples of the catalyst include organometallic compounds such as tin octylate, dibutyltin diacetate, dibutyltin di(2-ethylhexanoate), dibutyltin dilaurate, dioctyltin diacetate, dioctyltin di(2-ethylhexanoate), dioctyltin dineodecanoate, dibutyltin oxide, dibutyltin sulfide, dioctyltin oxide, dibutyltin fatty acid salts, lead 2-ethylhexanoate, zinc octylate, zinc naphthenate, fatty acid zinc, bismuth octanoate, bismuth 2-ethylhexanoate, bismuth oleate, bismuth neodecanoate, bismuth versatate, bismuth naphthenate, cobalt naphthenate, calcium octylate, copper naphthenate, and tetra (2-ethylhexyl) titanate; tertiary amines; and quaternary ammonium salts. These compounds may be used alone or in combination of two or more types.

The first in-mold coating composition (X) obtained as described above is preferably a so-called solvent-free in-mold coating composition and more preferably a thermosetting in-mold coating composition, and the solid content of the composition is preferably from 90 to 100 mass %, more preferably from 95 to 100 mass %, and even more preferably from 99 to 100 mass %.

In the present specification, the solid content refers to all components constituting the coating composition except for the solvent.

As the in-mold coating method, a known method of molding and coating in a mold can be used without particular limitation.

The resin molding mold used for molding of the resin material may be the same as or different from the first film-coating-mold used for in-mold coating of the first in-mold coating composition (X).

When the resin molding mold is the same as the first film-coating-mold, for example, a resin material heated and melted in an injection cylinder is injected between resin molding molds having the shape corresponding to an intended molded product, the injected resin material is then cooled and pressurized in the resin molding molds to form a molded article of the resin material, and the resin molding molds are then separated from the surface of the molded article of the resin material. Next, a gap sufficient for injecting the first in-mold coating composition (X) is provided between the surface of the molded article of the resin material and the first film-coating-mold, the first in-mold coating composition (X) is injected between the surface of the molded article of the resin material and the inner wall of the first film-coating-mold, and the first film-coating-mold is closed to produce an in-mold coated molded article having an uncured first in-mold coating film formed on the molded article of the resin material.

When the resin molding mold is different from the first film-coating-mold, for example, a resin material heated and melted in an injection cylinder is injected between resin molding molds having the shape corresponding to an intended molded product, the injected resin material is then cooled and pressurized in the resin molding molds to form a molded article of the resin material, and the resin molding molds are then removed from the surface of the molded article of the resin material. Next, the first film-coating-mold is brought close to the surface of the resin molded article, a gap sufficient for injecting the first in-mold coating composition (X) is provided between the surface of the molded article of the resin material and the first film-coating-mold, the first in-mold coating composition (X) is injected between the surface of the molded article of the resin material and the inner wall of the first film-coating-mold, and the first film-coating-mold is closed to produce an in-mold coated molded article having an uncured first in-mold coating film formed on the molded article of the resin material.

From the viewpoint of releasability between the in-mold coated molded article and the first film-coating-mold, the mold may be coated with an external mold release agent. As the external mold release agent, for example, a fluorine-based, silicone-based, surfactant-based, or wax-based external mold release agent can be used.

The heating temperature during melting of the resin in the injection cylinder is optionally determined according to, for example, the type of the resin material, and is preferably from 80 to 300° C. The temperature of the mold during injection of the resin material is optionally determined according to the molding time or the type of the resin material, and is preferably from 30 to 120° C.

The resin material may be completely solidified. However, the resin material may be solidified to such an extent that the shape of the molded article is not damaged when the first in-mold coating composition (X) is injected, and the molding time of the resin material is usually preferably from about 20 seconds to about 60 minutes.

The injection amount of the first in-mold coating composition (X) is an amount sufficient for achieving a desired film thickness, and is preferably an amount sufficient for achieving a cured film thickness of from 15 to 2000 μm.

[Step (2)]

Next, the uncured first in-mold coating film obtained in step (1) is heated and cured.

The heating temperature for heating of the uncured first in-mold coating film is preferably in a range from 80 to 160° C., more preferably in a range from 85 to 150° C., and even more preferably in a range from 90 to 140° C.

The heating time for heating of the uncured first in-mold coating film is preferably in a range from 20 seconds to 10 minutes, more preferably in a range from 30 seconds to 5 minutes, and even more preferably in a range from 40 seconds to 4 minutes.

When the uncured first in-mold coating film is heated and cured, the first in-mold coating film is preferably pressurized. The first in-mold coating film can be pressurized by, for example, pressurizing the first film-coating-mold.

In the case in which pressurization is carried out, the pressure is preferably within a range from 2 to 14 MPa from the viewpoint of the adhesion between the first in-mold coating film to be formed and the base material.

[Step (3)]

Next, the first film-coating-mold is separated from the surface of the cured first in-mold coating film.

[Step (4)]

Next, a gap is provided between the surface of the cured in-mold coating film and a second film-coating-mold.

The second film-coating-mold may be the same as or different from the first film-coating-mold that is used for forming and curing the first in-mold coating film.

When the first film-coating-mold is the same as the second film-coating-mold, for example, the first film-coating-mold is separated from the surface of the cured first in-mold coating film in the step (3), and then a gap sufficient for injecting the below-described second in-mold coating composition (Y) is provided between the surface of the cured first in-mold coating film and the second film-coating-mold.

When the first film-coating-mold is different from the second film-coating-mold, for example, the first film-coating-mold is separated from the surface of the cured first in-mold coating film in the step (3), and then the first film-coating-mold is removed. Next, the second film-coating-mold is brought close to the surface of the cured first in-mold coating film to provide a gap between the surface of the cured first in-mold coating film and the second film-coating-mold, the gap being sufficient for injecting the below-described second in-mold coating composition (Y).

[Step (5)]

Next, the second in-mold coating composition (Y) containing a compound (y1) that contains a second reactive functional group capable of reacting with the first reactive functional group is injected between the surface of the cured first in-mold coating film and the inner wall of the second film-coating-mold to form an uncured second in-mold coating film.

[Second In-Mold Coating Composition (Y)]

The second in-mold coating composition (Y) contains a compound (y1) containing a second reactive functional group capable of reacting with the first reactive functional group.

[Compound (y1) Containing Second Reactive Functional Group]

Examples of the compound (y1) containing a second reactive functional group include a compound containing a hydroxyl group, a compound containing an amino group, a compound containing a carboxyl group, a compound containing an epoxy group, a compound containing an isocyanate group, and a compound containing an alkoxysilyl group. Of these, the compound (y1) is preferably at least one compound selected from a compound containing a hydroxyl group, a compound containing an amino group, a compound containing a carboxyl group, a compound containing an epoxy group, and a compound containing an isocyanate group, is more preferably at least one compound selected from a compound containing a hydroxyl group and a compound containing an amino group, and is even more preferably a compound containing a hydroxyl group.

When such a compound is reactive with the first reactive functional group, the compound is included in the compound (y1) containing a second reactive functional group, whereas when the compound is not reactive with the first reactive functional group, the compound is not included in the compound (y1) containing a second reactive functional group. For example, when the first reactive functional group is an isocyanate group, a compound containing an epoxy group, a compound containing a carboxyl group, and a compound containing an alkoxysilyl group are not included in the compound (y1) containing a second reactive functional group.

The compound containing a hydroxyl group may be, for example, the compound containing a hydroxyl group and a polymerizable unsaturated group and exemplified regarding the compound (x11) containing a polymerizable unsaturated group and a second reactive functional group, and the compound containing a hydroxyl group and containing no polymerizable unsaturated group and exemplified regarding the compound (x2) containing a first reactive functional group other than a polymerizable unsaturated group and containing no polymerizable unsaturated group, and these compounds may be used alone or in combination of two or more types.

The compound containing a hydroxyl group preferably contains a hydroxyl group-containing polyester resin from the viewpoint of the interlayer adhesion between the first in-mold coating film and second in-mold coating film to be formed.

The compound containing an amino group may be, for example, the compound containing an amino group and a polymerizable unsaturated group and exemplified regarding the compound (x11) containing a polymerizable unsaturated group and a second reactive functional group, and the compound containing an amino group and containing no polymerizable unsaturated group and exemplified regarding the compound (x2) containing a first reactive functional group other than a polymerizable unsaturated group and containing no polymerizable unsaturated group, and these compounds may be used alone or in combination of two or more types.

As the compound containing an amino group, a compound containing an amino group and containing no polymerizable unsaturated group is preferably contained, and an aspartic acid ester amine is more preferably contained, from the viewpoint of the interlayer adhesion between the first in-mold coating film and second in-mold coating film to be formed.

The compound containing a carboxyl group may be, for example, the compound containing a carboxyl group and a polymerizable unsaturated group and exemplified regarding the compound (x11) containing a polymerizable unsaturated group and a second reactive functional group, and the compound containing a carboxyl group and containing no polymerizable unsaturated group and exemplified regarding the compound (x2) containing a first reactive functional group other than a polymerizable unsaturated group and containing no polymerizable unsaturated group, and these compounds may be used alone or in combination of two or more types.

The compound containing an epoxy group may be, for example, the compound containing an epoxy group and a polymerizable unsaturated group and exemplified regarding the compound (x11) containing a polymerizable unsaturated group and a second reactive functional group, and the compound containing an epoxy group and containing no polymerizable unsaturated group and exemplified regarding the compound (x2) containing a first reactive functional group other than a polymerizable unsaturated group and containing no polymerizable unsaturated group, and these compounds may be used alone or in combination of two or more types.

The compound containing an isocyanate group may be, for example, the compound containing an isocyanate group and a polymerizable unsaturated group and exemplified regarding the compound (x11) containing a polymerizable unsaturated group and a second reactive functional group, and the compound containing an isocyanate group and containing no polymerizable unsaturated group and exemplified regarding the compound (x2) containing a first reactive functional group other than a polymerizable unsaturated group and containing no polymerizable unsaturated group, and these compounds may be used alone or in combination of two or more types.

The compound containing an alkoxysilyl group may be, for example, the compound containing an alkoxysilyl group and a polymerizable unsaturated group and exemplified regarding the compound (x11) containing a polymerizable unsaturated group and a second reactive functional group, and the compound containing an alkoxysilyl group and containing no polymerizable unsaturated group and exemplified regarding the compound (x2) containing a first reactive functional group other than a polymerizable unsaturated group and containing no polymerizable unsaturated group, and these compounds may be used alone or in combination of two or more types.

The second in-mold coating composition (Y) described above preferably contains a compound (y2) containing a first reactive functional group and containing no polymerizable unsaturated group, from the viewpoints of interlayer adhesion between the first in-mold coating film and second in-mold coating film to be formed and weather resistance of the in-mold coated multi-layer coating film to be formed.

[Compound (y2) Containing First Reactive Functional Group and Containing No Polymerizable Unsaturated Group]

Examples of the compound (y2) containing a first reactive functional group and containing no polymerizable unsaturated group include a compound containing an isocyanate group and containing no polymerizable unsaturated group, a compound containing an epoxy group and containing no polymerizable unsaturated group, a compound containing a carboxyl group and containing no polymerizable unsaturated group, a compound containing a hydroxyl group and containing no polymerizable unsaturated group, a compound containing an amino group and containing no polymerizable unsaturated group, and a compound containing an alkoxysilyl group and containing no polymerizable unsaturated group. Of these, at least one compound selected from a compound containing an isocyanate group and containing no polymerizable unsaturated group, a compound containing an epoxy group and containing no polymerizable unsaturated group, a compound containing a carboxyl group and containing no polymerizable unsaturated group, a compound containing a hydroxyl group and containing no polymerizable unsaturated group, and a compound containing an amino group and containing no polymerizable unsaturated group is preferably contained, at least one compound selected from a compound containing an isocyanate group and containing no polymerizable unsaturated group and a compound containing an epoxy group and containing no polymerizable unsaturated group is more preferably contained, and a compound containing an isocyanate group and containing no polymerizable unsaturated group is even more preferably contained.

When such a compound is reactive with the second reactive functional group, the compound is included in the above-described compound (y2) containing a first reactive functional group and containing no polymerizable unsaturated group, whereas when the compound is not reactive with the second reactive functional group, the compound is not included in the compound (y2) containing a first reactive functional group and containing no polymerizable unsaturated group. For example, when the second reactive functional group is a hydroxyl group, a compound containing an epoxy group and containing no polymerizable unsaturated group, a compound containing a carboxyl group and containing no polymerizable unsaturated group, a compound containing an amino group and containing no polymerizable unsaturated group, and a compound containing a hydroxyl group and containing no polymerizable unsaturated group are not included in the compound (y2) containing a first reactive functional group and containing no polymerizable unsaturated group.

The compound containing an isocyanate group and containing no polymerizable unsaturated group may be, for example, the compounds containing an isocyanate group and containing no polymerizable unsaturated group and exemplified regarding the compound (x2) containing a first reactive functional group other than a polymerizable unsaturated group and containing no polymerizable unsaturated group, and these compounds may be used alone or in combination of two or more types.

The compound containing an epoxy group and containing no polymerizable unsaturated group may be, for example, the compounds containing an epoxy group and containing no polymerizable unsaturated group and exemplified regarding the compound (x2) containing a first reactive functional group other than a polymerizable unsaturated group and containing no polymerizable unsaturated group, and these compounds may be used alone or in combination of two or more types.

The compound containing a carboxyl group and containing no polymerizable unsaturated group may be, for example, the compounds containing a carboxyl group and containing no polymerizable unsaturated group and exemplified regarding the compound (x2) containing a first reactive functional group other than a polymerizable unsaturated group and containing no polymerizable unsaturated group, and these compounds may be used alone or in combination of two or more types.

The compound containing a hydroxyl group and containing no polymerizable unsaturated group may be, for example, the compounds containing a hydroxyl group and containing no polymerizable unsaturated group and exemplified regarding the compound (x2) containing a first reactive functional group other than a polymerizable unsaturated group and containing no polymerizable unsaturated group, and these compounds may be used alone or in combination of two or more types.

The compound containing an amino group and containing no polymerizable unsaturated group may be, for example, the compounds containing an amino group and containing no polymerizable unsaturated group and exemplified regarding the compound (x2) containing a first reactive functional group other than a polymerizable unsaturated group and containing no polymerizable unsaturated group, and these compounds may be used alone or in combination of two or more types.

The compound containing an alkoxysilyl group and containing no polymerizable unsaturated group may be, for example, the compounds containing an alkoxysilyl group and containing no polymerizable unsaturated group and exemplified regarding the compound (x2) containing a first reactive functional group other than a polymerizable unsaturated group and containing no polymerizable unsaturated group, and these compounds may be used alone or in combination of two or more types.

When the second in-mold coating composition (Y) contains, as the compound (y1) containing a second reactive functional group, a compound containing a polymerizable unsaturated group and a second reactive functional group, the composition (Y) preferably contains a "polymerizable unsaturated compound (y3) other than the compound containing a polymerizable unsaturated group and a second reactive functional group".

The "polymerizable unsaturated compound (y3) other than the compound containing a polymerizable unsaturated group and a second reactive functional group" may be, for example, the compounds exemplified regarding the above-described polymerizable unsaturated group-containing compound (x1), and these compounds may be used alone or in combination of two or more types. In the present invention, when the compound exemplified regarding the polymerizable unsaturated group-containing compound (x1) is reactive with the first reactive functional group, the compound is included in the compound (y1) containing the second reactive functional group and is not included in the polymerizable unsaturated compound (y3) other than the compound containing the polymerizable unsaturated group and a second reactive functional group.

[Additional Component]

The second in-mold coating composition (Y) can further contain, in addition to the components described above, a polymerization initiator, an internal mold release agent, an ultraviolet absorber, and/or a light stabilizer. The second in-mold coating composition (Y) can appropriately contain, as necessary, a crosslinking agent, a solvent (organic solvent, water), a pigment, a catalyst, an antioxidant, a surface conditioner, a defoamer, an emulsifier, a surfactant, an antifouling agent, a wetting agent, a thickener, a dye, and another additive component typically used in the field of coatings. For example, the compound exemplified regarding the first in-mold coating composition (X) can be used.

The second in-mold coating composition (Y) obtained as described above is preferably a so-called solvent-free in-mold coating composition (Y) and more preferably a thermosetting in-mold coating composition (Y), and the solid content of the composition is preferably from 90 to 100 mass %, more preferably from 95 to 100 mass %, and even more preferably from 99 to 100 mass %.

The injection amount of the second in-mold coating composition (Y) is an amount sufficient for achieving a desired film thickness, and is preferably an amount sufficient for achieving a cured film thickness of from 15 to 2000 μm.

[Step (6)]

Next, the uncured second in-mold coating film obtained in step (5) is heated and cured.

The heating temperature for heating of the uncured second in-mold coating film is preferably in a range from 60 to 160° C., more preferably in a range from 65 to 150° C., and even more preferably in a range from 80 to 140° C.

The heating time for heating of the uncured second in-mold coating film is preferably in a range from 20 seconds to 10 minutes, more preferably in a range from 30 seconds to 5 minutes, and even more preferably in a range from 40 seconds to 4 minutes.

When the uncured second in-mold coating film is heated and cured, the second in-mold coating film is preferably pressurized. The second in-mold coating film can be pressurized by, for example, pressurizing the second film-coating-mold.

In the case in which the pressurization is carried out, the pressure is preferably within a range from 2 to 14 MPa from viewpoint of the interlayer adhesion between the first in-mold coating film and second in-mold coating film to be formed.

A third coating film can be further formed on the in-mold coated multi-layer coating film formed by the above-described method of forming an in-mold coated multi-layer coating film.

The method for forming the third coating film is not particularly limited. For example, the third coating film can be formed by application through air spraying, airless spraying, a rotary atomizing coater, dip coating, an applicator, a brush, a roller, or in-mold coating. The method for forming the third coating film is preferably in-mold coating from the viewpoint of reducing the environmental burden.

When the third coating film is formed by in-mold coating, the third coating film can be formed by, for example, further carrying out the following steps (7) to (10) after the steps (1) to (6).

Step (7): separating the second film-coating-mold from the surface of the cured second in-mold coating film obtained through the above-mentioned steps (1) to (6);

Step (8): providing a gap between the surface of the cured second in-mold coating film and a third film-coating-mold;

Step (9): injecting a third in-mold coating composition (Z) between the surface of the cured second in-mold coating film and an inner wall of the third film-coating-mold to form an uncured third in-mold coating film; and Step (10): heating and curing the uncured third in-mold coating film.

When the third coating film is formed by in-mold coating, a known in-mold coating composition can be used as the third in-mold coating composition (Z). For example, an in-mold coating composition containing a resin component and, if necessary, further containing a common coating additive can be used.

The third film-coating-mold used for forming and curing the third in-mold coating film may be the same as or different from the second film-coating-mold used for forming and curing the second in-mold coating film.

When the second film-coating-mold is the same as the third film-coating-mold, for example, the second film-coating-mold is separated from the surface of the cured second in-mold coating film in step (7), and then a gap sufficient for injecting the third in-mold coating composition (Z) is provided between the surface of the cured second in-mold coating film and the third film-coating-mold.

When the second film-coating-mold is different from the third film-coating-mold, for example, the second film-coating-mold is separated from the surface of the cured second in-mold coating film in step (7), and then the second film-coating-mold is removed. Next, the third film-coating-mold is brought close to the surface of the cured second in-mold coating film to provide a gap between the surface of the cured second in-mold coating film and the third film-coating-mold, the gap being sufficient for injecting the third in-mold coating composition (Z).

A common thermosetting coating resin can be used as the above-mentioned resin component, and examples of the resin include base resins such as an acrylic resin, a vinyl resin, a polyester resin, and a polyamine resin. Furthermore, a crosslinking agent such as a melamine resin and a (blocked) polyisocyanate compound can be used in combination. In particular, a third in-mold coating composition (Z) containing a hydroxyl group- or amino group-containing base resin and a polyisocyanate compound as a crosslinking agent is preferred from the viewpoint of weather resistance of the in-mold coated multi-layer coating film to be formed.

EXAMPLES

The present invention will next be described in more detail with reference to Production Examples, Examples, and Comparative Examples. These Examples and Comparative Examples are merely exemplary and are not intended to limit the scope of the present invention. In the Examples and Comparative Examples, "parts" and "%" are based on mass unless otherwise specified. The thickness of a coating film is based on that of a cured coating film.

[Production of Molded Base Material]

Production Example 1

An injection molding cylinder was filled with "Novatec PP MA3" (trade name, polypropylene resin available from Japan Polypropylene Corp.), and the resin was heated and melted at 260° C. Subsequently, the heated and melted polypropylene resin was injected between resin molding molds at 40° C., and then cooled while the pressure was maintained for 45 seconds to thereby produce a polypropylene resin base material (S-1).

Production Example 2

An injection molding cylinder was filled with "UMG ABS PS-507" (trade name, ABS resin available from Techno-UMG Co., Ltd.), and the resin was heated and melted at 230° C. Subsequently, the heated and melted ABS resin was injected between resin molding molds at 60° C., and then cooled while the pressure was maintained for 30 seconds to thereby produce an acrylonitrile-butadiene-styrene resin (ABS resin) base material (S-2).

[Production of First In-Mold Coating Composition (X)]

Production Example 3

A reaction vessel equipped with a thermometer, a thermostat, and a stirrer was charged with 10 parts of 4-hydroxybutyl acrylate, 47 parts of styrene, 15 parts of tricyclodecanedimethanol diacrylate, and 5 parts of caprolactone-modified dipentaerythritol hexaacrylate, and then the materials were mixed and stirred at room temperature for 20 minutes. The mixture was heated to 50° C. with stirring, and then stirred for another 3 hours while the temperature was maintained at 50° C. Subsequently, the mixture was cooled to room temperature, and then homogeneously mixed with 20 parts (solid content: 20 parts) of "Sumidur N3300" (trade name, available from Sumika Covestro Urethane Co., Ltd., isocyanurate ring adduct of hexamethylene diisocyanate, solid content concentration: 100%), 3.5 parts (solid content: 3.5 parts) of "Perbutyl O" (available from NOF Corporation, polymerization initiator, solid content concentration: 100%), and 3 parts of zinc stearate, to thereby produce a first in-mold coating composition (X-1) having a solid content concentration of 100% and a viscosity of 100 mPa·s as measured with a B-type viscometer at 25° C. and 60 rpm.

Production Examples 4 to 25

First in-mold coating compositions (X-2) to (X-23) were produced in the same manner as in Production Example 3 except that the formulation composition of Production Example 3 was changed as shown in Table 1 below.

[Evaluation of Adhesion Between First In-Mold Coating Film and Polypropylene Resin Base Material (S-1) or ABS Resin Base Material (S-2)]

[Production of In-Mold Coated Molded Article for Evaluation of Adhesion Between First In-Mold Coating Film and Polypropylene Resin Base Material (S-1) or ABS Resin Base Material (S-2)]

Each of the first in-mold coating compositions (X-1) to (X-23) produced in Production Examples 3 to 25 was injected between the inner wall of a first film-coating-mold and the polypropylene resin base material (S-1) produced in Production Example 1 or the ABS resin base material (S-2) produced in Production Example 2 so as to achieve a cured film thickness of 100 μm, to thereby form an uncured first in-mold coating film. Next, the inside of the first film-coating-mold was heated to 130° C. and maintained at the temperature, and the mold was pressurized at a molding pressure of 4 MPa and maintained at the pressure for 3 minutes, to thereby produce an in-mold coated molded article for evaluating the adhesion between the first in-mold coating film and the polypropylene resin base material (S-1) or the ABS resin base material (S-2).

The above-produced in-mold coated molded article for evaluating the adhesion between the first in-mold coating film and the polypropylene resin base material (S-1) or the ABS resin base material (S-2) was immersed in 40° C. warm water for 240 hours, pulled out, and then dried at 20° C. for 12 hours. Thereafter, a grid pattern of 100 grids each measuring 2 mm×2 mm was formed on the coating surface in accordance with JIS K 5600-5-6 (1990), and an adhesive tape was adhered to the surface. The adhesive tape was quickly peeled off, and then the state of the remaining grid-patterned coating film was examined, to thereby evaluate the adhesion after the water resistance test according to the following criteria. ⊚ and ○ are acceptable. The evaluation results are shown in Table 1.

⊚: 100 grids of the grid-patterned coating film remained, and no edge chipping occurred.
○: 100 grids of the grid-patterned coating film remained, but edge chipping occurred.
x: The number of remaining grids of the grid-patterned coating film was 99 or less.

TABLE 1

| Production Examples | | | 3 | 4 | 5 | 6 |
|---|---|---|---|---|---|---|
| First In-Mold Coating Material Composition (X) No. | | | (X-1) | (X-2) | (X-3) | (X-4) |
| Polymerizable unsaturated compound (x1) | Compound containing polymerizable unsaturated group and hydroxyl group | 4-Hydroxybutyl acrylate | 10 | 10 | 10 | 10 |
| | | 2-Hydroxyethyl acrylate | | | | |
| | Vinyl aromatic compound (x12) | Styrene | 47 | 47 | 47 | 48 |
| | | Vinyltoluene | | | | |
| | | Methyl methacrylate | | | | |
| | | Tricyclodecanedimethanol diacrylate | 15 | 15 | 15 | 15 |
| | | Caprolactone-modified dipentaerythritol hexaacrylate | 5 | | 5 | 5 |
| | | Shikoh UV-7000B (Note 1) | | 5 | | |
| Compound containing isocyanate group and containing no polymerizable unsaturated group | | "Sumidur N3300" | 20 | 20 | | |
| | | "Desmodur N3400" (Note 2) | | | 20 | |
| | | "Desmodur N3900" (Note 3) | | | | 19 |
| Compound containing epoxy group and containing no polymerizable unsaturated group | | "jER-828" (Note 4) | | | | |
| Polymerization initiator | | PERBUTYL O | 3.5 | 3.5 | 3.5 | 3.5 |
| Internal mold release agent | | Zinc stearate | 3 | 3 | 3 | 3 |
| Content (mass %) of vinyl aromatic compound (x12) relative to content of polymerizable unsaturated group-containing compound (x1) | | | 61.0 | 61.0 | 61.0 | 61.5 |
| Evaluation | Adhesion between first in-mold coating film and resin base material | Adhesion between first in-mold coating film and polypropylene resin base material (S-1) | ⊚ | ⊚ | ⊚ | ⊚ |
| | | Adhesion between first in-mold coating film and ABS resin base material (S-2) | ⊚ | ⊚ | ⊚ | ⊚ |

| Production Examples | | | 7 | 8 | 9 | 10 |
|---|---|---|---|---|---|---|
| First In-Mold Coating Material Composition (X) No. | | | (X-5) | (X-6) | (X-7) | (X-8) |
| Polymerizable unsaturated compound (x1) | Compound containing polymerizable unsaturated group and hydroxyl group | 4-Hydroxybutyl acrylate | 12 | 11 | 8 | 6 |
| | | 2-Hydroxyethyl acrylate | | | | |
| | Vinyl aromatic compound (x12) | Styrene | 56 | 53 | 39 | 29 |
| | | Vinyltoluene | | | | |
| | | Methyl methacrylate | | | | |
| | | Tricyclodecanedimethanol diacrylate | 18 | 17 | 13 | 9 |
| | | Caprolactone-modified dipentaerythritol hexaacrylate | 6 | 6 | 4 | 3 |
| | | Shikoh UV-7000B (Note 1) | | | | |
| Compound containing isocyanate group and containing no polymerizable unsaturated group | | "Sumidur N3300" | 5 | 10 | 33 | 50 |
| | | "Desmodur N3400" (Note 2) | | | | |
| | | "Desmodur N3900" (Note 3) | | | | |
| Compound containing epoxy group and containing no polymerizable unsaturated group | | "jER-828" (Note 4) | | | | |
| Polymerization initiator | | PERBUTYL O | 3.5 | 3.5 | 3.5 | 3.5 |
| Internal mold release agent | | Zinc stearate | 3 | 3 | 3 | 3 |
| Content (mass %) of vinyl aromatic compound (x12) relative to content of polymerizable unsaturated group-containing compound (x1) | | | $1.0 | 61.0 | 61.0 | 61.0 |
| Evaluation | Adhesion between first in-mold coating film and resin base material | Adhesion between first in-mold coating film and polypropylene resin base material (S-1) | ⊚ | ⊚ | ⊚ | ○ |
| | | Adhesion between first in-mold coating film and ABS resin base material (S-2) | ○ | ○ | ○ | ○ |

TABLE 1-continued

| Production Examples | | | 11 | 12 | 13 | 14 |
|---|---|---|---|---|---|---|
| First In-Mold Coating Material Composition (X) No. | | | (X-9) | (X-10) | (X-11) | (X-12) |
| Polymerizable unsaturated compound (x1) | Compound containing polymerizable unsaturated group and a hydroxyl group | 4-Hydroxybutyl acrylate | | | 1 | 5 |
| | | 2-Hydroxyethyl acrylate | 10 | | | |
| | Vinyl aromatic compound (x12) | Styrene | 27 | 47 | 52 | 50 |
| | | Vinyltoluene | | | | |
| | | Methyl methacrylate | | | | |
| | | Tricyclodecanedimethanol diacrylate | 15 | 25 | 12 | 11 |
| | | Caprolactone-modified dipentaerythritol hexaacrylate | 25 | 5 | 12 | 11 |
| | | Shikoh UV-7000B (Note 1) | | | | |
| Compound containing isocyanate group and containing no polymerizable unsaturated group | | "Sumidur N3300" | 20 | 20 | 20 | 20 |
| | | "Desmodur N3400" (Note 2) | | | | |
| | | "Desmodur N3900" (Note 3) | | | | |
| Compound containing epoxy group and containing no polymerizable unsaturated group | | "jER-828" (Note 4) | | | | |
| Polymerization initiator | | PERBUTYL O | 3.5 | 3.5 | 3.5 | 3.5 |
| Internal mold release agent | | Zinc stearate | 3 | 3 | 3 | 3 |
| Content (mass %) of vinyl aromatic compound (x12) relative to content of polymerizable unsaturated group-containing compound (x1) | | | 35.1 | 61.0 | 67.5 | 64.9 |
| Evaluation | Adhesion between first in-mold coating film and resin base material | Adhesion between first in-mold coating film and polypropylene resin base material (S-1) | ◎ | ◎ | ◎ | ◎ |
| | | Adhesion between first in-mold coating film and ABS resin base material (S-2) | ○ | ◎ | ○ | ○ |

| Production Examples | | | 15 | 16 | 17 | 18 |
|---|---|---|---|---|---|---|
| First In-Mold Coating Material Composition (X) No. | | | (X-13) | (X-14) | (X-15) | (X-16) |
| Polymerizable unsaturated compound (x1) | Compound containing polymerizable unsaturated group and a hydroxyl group | 4-Hydroxybutyl acrylate | 20 | 40 | 10 | 10 |
| | | 2-Hydroxyethyl acrylate | | | | |
| | Vinyl aromatic compound (x12) | Styrene | 39 | 25 | | |
| | | Vinyltoluene | | | 27 | |
| | | Methyl methacrylate | | | | 47 |
| | | Tricyclodecanedimethanol diacrylate | 9 | 6 | 15 | 15 |
| | | Caprolactone-modified dipentaerythritol hexaacrylate | 9 | 6 | 25 | 5 |
| | | Shikoh UV-7000B (Note 1) | | | | |
| Compound containing isocyanate group and containing no polymerizable unsaturated group | | "Sumidur N3300" | 20 | 20 | 20 | 20 |
| | | "Desmodur N3400" (Note 2) | | | | |
| | | "Desmodur N3900" (Note 3) | | | | |
| Compound containing epoxy group and containing no polymerizable unsaturated group | | "jER-828" (Note 4) | | | | |
| Polymerization initiator | | PERBUTYL O | 3.5 | 3.5 | 3.5 | 3.5 |
| Internal mold release agent | | Zinc stearate | 3 | 3 | 3 | 3 |
| Content (mass %) of vinyl aromatic compound (x12) relative to content of polymerizable unsaturated group-containing compound (x1) | | | 50.9 | 32.6 | 35.1 | 0.0 |
| Evaluation | Adhesion between first in-mold coating film and resin base material | Adhesion between first in-mold coating film and polypropylene resin base material (S-1) | ◎ | ◎ | ◎ | ○ |
| | | Adhesion between first in-mold coating film and ABS resin base material (S-2) | ◎ | ○ | ○ | ◎ |

| Production Examples | | | 19 | 20 | 21 | 22 |
|---|---|---|---|---|---|---|
| First In-Mold Coating Material Composition (X) No. | | | (X-17) | (X-18) | (X-19) | (X-20) |
| Polymerizable unsaturated compound (x1) | Compound containing polymerizable unsaturated group and hydroxyl group | 4-Hydroxybutyl acrylate | 10 | 10 | 10 | 5 |
| | | 2-Hydroxyethyl acrylate | | | | |
| | Vinyl aromatic compound (x12) | Styrene | 12 | 17 | 67 | 72 |
| | | Vinyltoluene | | | | |
| | | Methyl methacrylate | 35 | 30 | | |
| | | Tricyclodecanedimethanol diacrylate | 15 | 15 | | |
| | | Caprolactone-modified dipentaerythritol hexaacrylate | 5 | 5 | | |
| | | Shikoh UV-7000B (Note 1) | | | | |
| Compound containing isocyanate group and containing no polymerizable unsaturated group | | "Sumidur N3300" | 20 | 20 | 20 | 20 |
| | | "Desmodur N3400" (Note 2) | | | | |
| | | "Desmodur N3900" (Note 3) | | | | |
| Compound containing epoxy group and containing no polymerizable unsaturated group | | "jER-828" (Note 4) | | | | |
| Polymerization initiator | | PERBUTYL O | 3.5 | 3.5 | 3.5 | 3.5 |
| Internal mold release agent | | Zinc stearate | 3 | 3 | 3 | 3 |
| Content (mass %) of vinyl aromatic compound (x12) relative to content of polymerizable unsaturated group-containing compound (x1) | | | 15.6 | 22. | 87.0 | 93.5 |

TABLE 1-continued

| Evaluation | Adhesion between first in-mold coating film and resin base material | Adhesion between first in-mold coating film and polypropylene resin base material (S-1) | ○ | ◎ | ◎ | ◎ |
|---|---|---|---|---|---|---|
| | | Adhesion between first in-mold coating film and ABS resin base material (S-2) | ○ | ○ | ○ | ○ |

| | | | Production Examples | 23 | 24 | 25 |
|---|---|---|---|---|---|---|
| | | First In-Mold Coating Material Composition (X) No. | | (X-21) | (X-22) | (X-23) |
| Polymerizable unsaturated compound (x1) | Compound containing polymerizable unsaturated group and hydroxyl group | 4-Hydroxybutyl acrylate | | 10 | 10 | 10 |
| | | 2-Hydroxyethyl acrylate | | | | |
| | Vinyl aromatic compound (x12) | Styrene | | 50 | 47 | 67 |
| | | Vinyltoluene | | | | |
| | | Methyl methacrylate | | | | |
| | | Tricyclodecanedimethanol diacrylate | | 15 | 15 | 15 |
| | | Caprolactone-modified dipentaerythritol hexaacrylate Shikoh UV-7000B (Note 1) | | 5 | 5 | 5 |
| Compound containing isocyanate group and containing no polymerizable unsaturated group | | "Sumidur N3300" | | 20 | | |
| | | "Desmodur N3400" (Note 2) | | | | |
| | | "Desmodur N3900" (Note 3) | | | | |
| Compound containing epoxy group and containing no polymerizable unsaturated group | | "jER-828" (Note 4) | | | | 20 |
| Polymerization initiator | | PERBUTYL O | | 3.5 | 3.5 | 3.5 |
| Internal mold release agent | | Zinc stearate | | | 3 | 3 |
| Content (mass %) of vinyl aromatic compound (x12) relative to content of polymerizable unsaturated group-containing compound (x1) | | | | 62.5 | 61.0 | 69.1 |
| Evaluation | Adhesion between first in-mold coating film and resin base material | Adhesion between first in-mold coating film and polypropylene resin base material (S-1) | | ◎ | ○ | ◎ |
| | | Adhesion between first in-mold coating film and ABS resin base material (S-2) | | ◎ | ○ | ○ |

(Note 1)
"Shikoh UV-7000B": trade name, available from Mitsubishi Chemical Corporation, medium-hard type urethane acrylate, solid content concentration of 100%
(Note 2)
"Desmodur N3400": trade name, available from Sumika Covestro Urethane Co., Ltd., uretdione ring adduct of hexamethylene diisocyanate, solid content concentration of 100%
(Note 3)
"Desmodur N3900": trade name, available from Sumika Covestro Urethane Co., Ltd., polyisocyanate compound of hexamethylene diisocyanate, solid content concentration of 100%
(Note 4)
"jER-828": trade name, available from Mitsubishi Chemical Corporation, epoxy resin having an epoxy equivalent of 190, solid content concentration of 100%

[Production of Pigment Dispersion (P)]

Production Example 26

A container equipped with a stirrer was filled with 1 part (solid content: 1 part) of "Carbon MA-100" (trade name, available from Mitsubishi Chemical Corporation, carbon black, solid content concentration: 100%) and 0.25 parts (solid content: 0.25 parts) of "DISPERBYK-2013" (trade name, available from BYK-Chemie GmbH, dispersant, solid content concentration: 100%), and the materials were homogeneously mixed. The resulting mixed solution was then placed into a wide-mouth glass bottle. Glass beads with a diameter of approximately 1.3 mmφ were added as a dispersion medium, and the wide-mouth glass bottle was sealed. The mixture was then dispersed with a paint shaker for 4 hours, to produce a pigment dispersion (P-1).

[Production of Second In-Mold Coating Composition (Y)]

Production Example 27

A reaction vessel equipped with a thermometer, a thermostat, and a stirrer was charged with 10 parts of 4-hydroxybutyl acrylate, 65.75 parts of styrene, 15 parts of tricyclodecanedimethanol diacrylate, and 5 parts of caprolactone-modified dipentaerythritol hexaacrylate, and the mixture was heated to 50° C. with stirring. Thereafter, the temperature was maintained at 50° C., and the mixture was stirred at room temperature for 3 hours. Subsequently, the mixture was cooled to room temperature, and 1.25 parts (solid content: 1.25 parts) of the pigment dispersion (P-1) produced in Production Example 26, 3.5 parts (3.5 parts) of "Perbutyl O" (available from NOF Corporation, polymerization initiator, solid content concentration: 100%), and 3 parts of zinc stearate were added and homogeneously mixed, to thereby produce a second in-mold coating composition (Y-1) having a solid content concentration of 100% and a viscosity of 200 mPa·s as measured with a B-type viscometer at 25° C. and 60 rpm.

Production Examples 28, 29, and 35

Second in-mold coating compositions (Y-2), (Y-3), and (Y-9) were produced in the same manner as in Production Example 27 except that the formulation composition of Production Example 27 was changed as shown in Table 2 below.

Production Example 30

A reaction vessel equipped with a thermometer, a thermostat, and a stirrer was charged with 30.4 parts (solid content: 30.4 parts) of "Desmophen XP2488" (trade name, available from Covestro AG, hydroxyl group-containing polyester resin, solid content concentration: 100%), 2.35 parts of benzyl alcohol, 62 parts (solid content: 62 parts) of "Sumidur N3300" (trade name, available from Sumika Covestro Urethane Co., Ltd., isocyanurate ring adduct of hexamethylene diisocyanate, solid content concentration: 100%), 1.25 parts (solid content: 1.25 parts) of the pigment dispersion (P-1) produced in Production Example 26, 0.4 parts (solid content: 0.39 parts) of "BYK-333" (trade name, available from BYK-Chemie GmbH, surface conditioner, solid content concentration: 98%), 1 part (solid content: 1 part) of "TINUVIN 400" (trade name, available from BASF SE, ultraviolet absorber, solid content concentration: 100%), 1 part (solid content: 1 part) of "TINUVIN 292" (trade name, available from BASF SE, light stabilizer, solid content concentration: 100%), 0.6 parts (solid content: 0.6 parts) of "NEOSTANN U-830" (trade name, available from Nitto Kasei Co., Ltd., tin catalyst, solid content concentration: 100%), and 3 parts of zinc stearate, and the materials were homogeneously mixed, to thereby produce a second in-mold coating composition (Y-4) having a solid content concentration of 100% and a viscosity of 3000 mPa·s as measured with a B-type viscometer at 25° C. and 60 rpm.

Production Examples 31 to 34

Second in-mold coating compositions (Y-5) to (Y-8) were produced in the same manner as in Production Example 30 except that the formulation composition of Production Example 30 was changed as shown in Table 2 below.

TABLE 2

| Production Examples | | | 27 | 28 | 29 | 30 | 31 |
|---|---|---|---|---|---|---|---|
| Second In-Mold Coating Material Composition (Y) No. | | | (Y-1) | (Y-2) | (Y-3) | (Y-4) | (Y-5) |
| Hydroxyl group-containing compound | Compound containing polymerizable unsaturated group and hydroxyl group | 4-Hydroxybutyl acrylate | 10 | | | 10 | |
| | | 2-Hydroxyethyl acrylate | | 10 | | | |
| | Compound containing hydroxyl group and containing no polymerizable unsaturated group | "Desmophen XP 2488" | | | | 30.4 | 24.4 |
| | | "Desmophen VPLS 2249/1" (Note 5) | | | | | 7 |
| | | Benzyl alcohol | | | | 2.36 | 2.36 |
| Compound containing amino group and containing no polymerizable unsaturated group | | "Desmophen NH 1420" (Note 6) | | | | | |
| | | "Desmophen NH 1220" (Note 7) | | | | | |
| Compound containing isocyanate group and containing no polymerizable unsaturated group | | "Sumidur N3300" | | | | 62 | 61 |
| Additional polymerizable unsaturated compound | | Styrene | 65.75 | 45.75 | 68.75 | | |
| | | Tricyclodecanedimethanol diacrylate | 1.5 | 15 | 15 | | |
| | | Caprolactone-modified dipentaerythritol hexaacrylate | 5 | 25 | 5 | | |
| Pigment dispersion (P-1) | Color pigment | "Carbon MA-100" | 1 | 1 | 1 | 1 | 1 |
| | Dispersant | "DISPERBYK-2013" | 0.25 | 0.25 | 0.25 | 0.25 | 0.25 |
| Surface conditioner | | "BYK-333" | | | | 0.39 | 0.39 |
| Ultraviolet Absorber | | "TINUVIN 400" | | | | 1 | 1 |
| Light stabilizer | | "TINUVIN 292" | | | | 1 | 1 |
| Polymerization initiator | | PERBUTYL O | 3.5 | 3.5 | 3.5 | | |
| Catalyst | | "NEOSTANN U-830" | | | | 0.6 | 0.6 |
| Internal mold release agent | | Zinc stearate | 3 | 3 | | 1 | 1 |

| Production Examples | | | 32 | 33 | 34 | 35 |
|---|---|---|---|---|---|---|
| Second In-Mold Coating Material Composition (Y) No. | | | (Y-6) | (Y-7) | (Y-8) | (Y-9) |
| Hydroxyl group-containing compound | Compound containing polymerizable unsaturated group and hydroxyl group | 4-Hydroxybutyl acrylate | | | | |
| | | 2-Hydroxyethyl acrylate | | | | |
| | Compound containing hydroxyl group and containing no polymerizable unsaturated group | "Desmophen XP 2488" | | | 31.4 | |
| | | "Desmophen VPLS 2249/1" (Note 5) | | | | |
| | | Benzyl alcohol | | | 2.36 | |
| Compound containing amino group and containing no polymerizable unsaturated group | | "Desmophen NH 1420" (Note 6) | 32.76 | | | |
| | | "Desmophen NH 1220" (Note 7) | | 32.76 | | |
| Compound containing isocyanate group and containing no polymerizable unsaturated group | | "Sumidur N3300" | 62 | 62 | 62 | |
| Additional polymerizable unsaturated compound | | Styrene | | | | 65.75 |
| | | Tricyclodecanedimethanol diacrylate | | | | 25 |
| | | Caprolactone-modified dipentaerythritol hexaacrylate | | | | 5 |
| Pigment dispersion (P-1) | Color pigment | "Carbon MA-100" | 1 | 1 | 1 | 1 |
| | Dispersant | "DISPERBYK-2013" | 0.25 | 0.25 | 0.25 | 0.25 |
| Surface conditioner | | "BYK-333" | 0.39 | 0.39 | 0.39 | |
| Ultraviolet Absorber | | "TINUVIN 400" | 1 | 1 | 1 | |
| Light stabilizer | | "TINUVIN 292" | 1 | 1 | 1 | |
| Polymerization initiator | | PERBUTYL O | | | | 3.5 |
| Catalyst | | "NEOSTANN U-830" | 0.6 | 0.6 | 0.6 | |
| Internal mold release agent | | Zinc stearate | 1 | 1 | | 3 |

(Note 5) "Desmophen VPLS 2249/1": trade name, hydroxyl group-containing polyester resin available from Covestro AG, solid content concentration: 100%
(Note 6) "Desmophen NH1420": trade name, aspartic acid ester amine available from Covestro AG, solid content concentration: 100%
(Note 7) "Desmophen NH1220": trade name, aspartic acid ester amine available from Covestro AG, solid content concentration: 100%

Production of Third In-Mold Coating Composition (Z)

Production Example 36

A reaction vessel equipped with a thermometer, a thermostat, and a stirrer was charged with 31 parts (solid content: 31 parts) of "Desmophen XP2488" (trade name, available from Covestro AG, hydroxyl group-containing polyester resin, solid content concentration: 100%), 3 parts of benzyl alcohol, 62 parts (solid content: 62 parts) of "Sumidur N3300" (trade name, available from Sumika Covestro Urethane Co., Ltd., isocyanurate ring adduct of hexamethylene diisocyanate, solid content concentration: 100%), 0.4 parts (solid content: 0.39 parts) of "BYK-333" (trade name, available from BYK-Chemie GmbH, surface conditioner, solid content concentration: 98%), 1 part (solid content: 1 part) of "TINUVIN 400" (trade name, available from BASF SE, ultraviolet absorber, solid content concentration: 100%), 1 part (solid content: 1 part) of "TINUVIN 292" (trade name, available from BASF SE, light stabilizer, solid content concentration: 100%), 0.6 parts (solid content: 0.6 parts) of "NEOSTANN U-830" (trade name, available from Nitto Kasei Co., Ltd., tin catalyst, solid content concentration: 100%), and 1 part of zinc stearate, and the materials were homogeneously mixed, to thereby produce a third in-mold coating composition (Z-1) having a solid content concentration of 100% and a viscosity of 3000 mPa·s as measured with a B-type viscometer at 25° C. and 60 rpm.

Production Example 37

A reaction vessel equipped with a thermometer, a thermostat, and a stirrer was charged with 25 parts (solid content: 25 parts) of "Desmophen XP2488" (trade name, available from Covestro AG, hydroxyl group-containing polyester resin, solid content concentration: 100%), 7 parts (solid content: 7 parts) of "Desmophen VPLS 2249/1" (trade name, available from Covestro AG, hydroxyl group-containing polyester resin, solid content concentration: 100%), 3 parts of benzyl alcohol, 61 parts (solid content: 61 parts) of "Sumidur N3300" (trade name, available from Sumika Covestro Urethane Co., Ltd., isocyanurate ring adduct of hexamethylene diisocyanate, solid content concentration: 100%), 0.4 parts (solid content: 0.39 parts) of "BYK-333" (trade name, available from BYK-Chemie GmbH, surface conditioner, solid content concentration: 98%), 1 part (solid content: 1 part) of "TINUVIN 400" (trade name, available from BASF SE, ultraviolet absorber, solid content concentration: 100%), 1 part (solid content: 1 part) of "TINUVIN 292" (trade name, available from BASF SE, light stabilizer, solid content concentration: 100%), 0.6 parts (solid content: 0.6 parts) of "NEOSTANN U-830" (trade name, available from Nitto Kasei Co., Ltd., tin catalyst, solid content concentration: 100%), and 1 part of zinc stearate, and the materials were homogeneously mixed, to thereby produce a third in-mold coating composition (Z-2) having a solid content concentration of 100% and a viscosity of 3000 mPa·s as measured with a B-type viscometer at 25° C. and 60 rpm.

[Production of In-Mold Multi-Layer Film-Coated Molded Article]

Example 1

The first in-mold coating composition (X-1) produced in Production Example 3 was injected between the polypropylene resin base material (S-1) produced in Production Example 1 and the inner wall of the first film-coating-mold so as to achieve a cured film thickness of 100 μm, to thereby form an uncured first in-mold coating film.

Next, the interior of the first film-coating-mold was heated to 130° C. While the temperature was maintained, the mold was pressurized at a molding pressure of 4 MPa and maintained at the pressure for 3 minutes, to thereby form a cured first in-mold coating film on the polypropylene resin base material (S-1).

Next, the pressure in the first film-coating-mold was reduced, and the first film-coating-mold was separated from the surface of the cured first in-mold coating film.

Next, a gap sufficient for injecting the second in-mold coating composition (Y) was provided between the surface of the cured first in-mold coating film and a second film-coating-mold, and the second in-mold coating composition (Y-1) produced in Production Example 27 was injected into the gap so as to achieve a cured film thickness of 100 μm, to thereby form an uncured second in-mold coating film.

Subsequently, the interior of the second film-coating-mold was heated to 130° C. While the temperature was maintained, the mold was pressurized at a molding pressure of 4 MPa and maintained at the pressure for 1 minute, and then the pressure was reduced, and the second film-coating-mold was opened, to thereby produce an in-mold multi-layer film-coated molded article having the cured second in-mold coating film formed on the cured first in-mold coating film.

In Example 1, the first reactive functional group was an isocyanate group, and the second reactive functional group was a hydroxyl group.

Examples 2 to 50 and Comparative Examples 1 to 4

In-mold multi-layer film-coated molded articles were produced in the same manner as in Example 1 except that the combination of the molded base material, the first in-mold coating composition (X), and the second in-mold coating composition (Y) in Example 1 was changed as shown in Table 3.

Example 51

An uncured second in-mold coating film was formed in the same manner as in Example 1.

Next, the interior of the second film-coating-mold was heated to 130° C. While the temperature was maintained, the mold was pressurized at a molding pressure of 4 MPa and maintained at the pressure for 3 minutes, to thereby form a cured second in-mold coating film on the cured first in-mold coating film.

Next, the pressure in the mold was reduced, and the second film-coating-mold was separated from the surface of the cured second in-mold coating film.

Subsequently, a gap sufficient for injecting a third in-mold coating composition (Z) was provided between the surface of the cured second in-mold coating film and a third film-coating-mold, and the third in-mold coating composition (Z-1) produced in Production Example 36 was injected into the gap so as to achieve a cured film thickness of 100 μm, to thereby form an uncured third in-mold coating film.

Next, the interior of the mold was heated to 80° C. While the temperature was maintained, the mold was pressurized at a molding pressure of 4 MPa and maintained at the pressure for 1 minute, and then the pressure was reduced, and the mold was opened, to thereby produce an in-mold multi-layer film-coated molded article having the cured third in-mold coating film formed on the cured second in-mold coating film.

In Example 51, the first reactive functional group was an isocyanate group, and the second reactive functional group was a hydroxyl group.

Examples 52 to 55 and Comparative Examples 5 to 8

In-mold multi-layer film-coated molded articles were prepared in the same manner as in Example 51 except that the combination of the molded base material, the first in-mold coating composition (X), the second in-mold coating composition (Y), and the third in-mold coating composition (Z) in Example 51 was changed as shown in Table 3.

Comparative Example 9

The first in-mold coating composition (X-1) produced in Production Example 3 was injected between the polypropylene resin base material (S-1) produced in Production Example 1 and the inner wall of the mold so as to achieve a cured film thickness of 100 µm, to thereby form an uncured first in-mold coating film.

Next, the interior of the mold was heated to 130° C. While the temperature was maintained, the mold was pressurized at a molding pressure of 4 MPa and maintained at the pressure for 1 minute, and then the pressure was reduced, and the mold was opened, to thereby form an in-mold film-coated molded article having the cured first in-mold coating film formed on the polypropylene resin base material (S-1).

Comparative Example 10

An in-mold multi-layer film-coated molded article was produced in the same manner as in Comparative Example 9 except that the combination of the molded base material and the first in-mold coating composition (X) in Comparative Example 9 was changed as shown in Table 3.

[Evaluation of Interlayer Adhesion]

A grid pattern of 100 grids each measuring 2 mm×2 mm was formed on the coating surface of each of the in-mold multi-layer film-coated molded articles produced in Examples 1 to 55 and Comparative Examples 1 to 8 in accordance with JIS K 5600-5-6 (1990), and an adhesive tape was adhered to the surface. The adhesive tape was quickly peeled off, and then the state of the remaining grid-patterned coating film was examined, to thereby evaluate the interlayer adhesion according to the following criteria. ⊚ and ○ are acceptable. When the coating film was peeled off between the base material and the first in-mold coating film, the evaluation was not conducted. The evaluation results are shown in Table 3.

⊚: 100 grids of the grid-patterned coating film remained, and no edge chipping occurred.

○: 100 grids of the grid-patterned coating film remained, but edge chipping occurred.

x: The number of remaining grids of the grid-patterned coating film was 99 or less.

[Evaluation of Weather Resistance]

Each of the in-mold multi-layer film-coated molded articles produced in Examples 1 to 55 and Comparative Examples 1 to 8 and the in-mold film-coated molded articles produced in Comparative Examples 9 and 10 was subjected to an accelerated weathering test according to JIS K 5600-7-7 using a "Super Xenon Weather Meter" (weather resistance tester available from Suga Test Instruments Co., Ltd.) under the following conditions: test piece wetting cycle: 18 minutes/2 hours and black panel temperature: 61 to 65° C. Next, at the point in time when the lamp irradiation time reached 2000 hours, a grid pattern of 100 grids each measuring 2 mm×2 mm was formed on the coating surface in accordance with JIS K 5600-5-6 (1990), and an adhesive tape was adhered to the surface. The adhesive tape was quickly peeled off, and then the state of the remaining grid-patterned coating film was examined, to thereby evaluate the interlayer adhesion according to the following criteria. ⊚ and ○ are acceptable. The evaluation results are shown in Table 3.

⊚: 100 grids of the grid-patterned coating film remained.

○: 98 to 99 grids of the grid-patterned coating film remained.

x: The number of remaining grids of the grid-patterned coating film was 97 or less.

TABLE 3

| | Examples | | | | |
| --- | --- | --- | --- | --- | --- |
| | 1 | 2 | 3 | 4 | 5 |
| Molded Base Material Name | (S-1) | (S-1) | (S-1) | (S-1) | (S-1) |
| First In-Mold Coating Material Composition (X) No. | (X-1) | (X-2) | (X-3) | (X-4) | (X-5) |
| Second In-Mold Coating Material Composition (Y) No. | (Y-1) | (Y-1) | (Y-1) | (Y-1) | (Y-1) |
| Third In-Mold Coating Material Composition (Z) No. | — | — | — | — | — |
| First reactive functional group | Isocyanate group | Isocyanate group | Isocyanate group | Isocyanate group | Isocyanate group |
| Second reactive functional group | Hydroxyl group | Hydroxyl group | Hydroxyl group | Hydroxyl group | Hydroxyl group |
| Compound (x2) containing first reactive functional group other than polymerizable unsaturated group and containing no polymerizable unsaturated group | "Sumidur N3300" | "Sumidur N3300" | "Desmodur N3400" | "Desmodur N3900" | "Sumidur N3300" |
| Compound (x11) containing second reactive functional group and polymerizable unsaturated group | 4-Hydroxybutyl acrylate | 4-Hydroxybutyl acrylate | 4-Hydroxybutyl acrylate | 4-Hydroxybutyl acrylate | 4-Hydroxybutyl acrylate |
| Compound (y1) containing second reactive functional group | 4-Hydroxybutyl acrylate | 4-Hydroxybutyl acrylate | 4-Hydroxybutyl acrylate | 4-Hydroxybutyl acrylate | 4-Hydroxybutyl acrylate |
| Compound (y2) containing first reactive | — | — | — | — | — |

TABLE 3-continued

| | | | | | |
|---|---|---|---|---|---|
| fictional group and containing no polymerizable unsaturated group | | | | | |
| Evaluation | Interlayer adhesion | ◎ | ◎ | ◎ | ◎ | ○ |
| | Weather resistance | ○ | ○ | ○ | ○ | ○ |

| | | Examples | | | |
|---|---|---|---|---|---|
| | | 6 | 7 | 8 | 9 |
| Molded Base Material Name | | (S-1) | (S-1) | (S-1) | (S-1) |
| First In-Mold Coating Material Composition (X) No. | | (X-6) | (X-7) | (X-8) | (X-9) |
| Second In-Mold Coating Material Composition (Y) No. | | (Y-1) | (Y-1) | (Y-1) | (Y-1) |
| Third In-Mold Coating Material Composition (Z) No. | | — | — | — | — |
| First reactive functional group | | Isocyanate group | Isocyanate group | Isocyanate group | Isocyanate group |
| Second reactive functional group | | Hydroxyl group | Hydroxyl group | Hydroxyl group | Hydroxyl group |
| Compound (x2) containing first reactive functional group other than polymerizable unsaturated group and containing no polymerizable unsaturated group | | "Sumidur N3300" | "Sumidur N3300" | "Sumidur N3300" | "Sumidur N3300" |
| Compound (x11) containing second reactive functional group and polymerizable unsaturated group | | 4-Hydroxybutyl acrylate | 4-Hydroxybutyl acrylate | 4-Hydroxybutyl acrylate | 2-Hydroxyethyl acrylate |
| Compound (y1) containing second reactive functional group | | 4-Hydroxybutyl acrylate | 4-Hydroxybutyl acrylate | 4-Hydroxybutyl acrylate | 4-Hydroxybutyl acrylate |
| Compound (y2) containing first reactive fictional group and containing no polymerizable unsaturated group | | — | — | — | — |
| Evaluation | Interlayer adhesion | ◎ | ◎ | ◎ | ○ |
| | Weather resistance | ○ | ○ | ○ | ○ |

| | | Examples | | | |
|---|---|---|---|---|---|
| | | 10 | 11 | 12 | 13 |
| Molded Base Material Name | | (S-1) | (S-1) | (S-1) | (S-1) |
| First In-Mold Coating Material Composition (X) No. | | (X-10) | (X-11) | (X-12) | (X-13) |
| Second In-Mold Coating Material Composition (Y) No. | | (Y-1) | (Y-1) | (Y-1) | (Y-1) |
| Third In-Mold Coating Material Composition (Z) No. | | — | — | — | — |
| First reactive functional group | | Isocyanate group | Isocyanate group | Isocyanate group | Isocyanate group |
| Second reactive functional group | | Hydroxyl group | Hydroxyl group | Hydroxyl group | Hydroxyl group |
| Compound (x2) containing first reactive functional group other than polymerizable unsaturated group and containing no polymerizable unsaturated group | | "Sumidur N3300" | "Sumidur N3300" | "Sumidur N3300" | "Sumidur N3300" |
| Compound (x11) containing second reactive functional group and polymerizable unsaturated group | | — | 4-Hydroxybutyl acrylate | 4-Hydroxybutyl acrylate | 4-Hydroxybutyl acrylate |
| Compound (y1) containing second reactive functional group | | 4-Hydroxybutyl acrylate | 4-Hydroxybutyl acrylate | 4-Hydroxybutyl acrylate | 4-Hydroxybutyl acrylate |
| Compound (y2) containing first reactive fictional group and containing no polymerizable unsaturated group | | — | — | — | — |
| Evaluation | Interlayer adhesion | ○ | ○ | ◎ | ◎ |
| | Weather resistance | ○ | ○ | ○ | ○ |

| | | Examples | | | |
|---|---|---|---|---|---|
| | | 14 | 15 | 16 | 17 |
| Molded Base Material Name | | (S-1) | (S-1) | (S-1) | (S-1) |
| First In-Mold Coating Material Composition (X) No. | | (X-14) | (X-15) | (X-16) | (X-17) |
| Second In-Mold Coating Material Composition (Y) No. | | (Y-1) | (Y-1) | (Y-1) | (Y-1) |
| Third In-Mold Coating Material Composition (Z) No. | | — | — | — | — |
| First reactive functional group | | Isocyanate group | Isocyanate group | Isocyanate group | Isocyanate group |
| Second reactive functional group | | Hydroxyl group | Hydroxyl group | Hydroxyl group | Hydroxyl group |
| Compound (x2) containing first reactive | | "Sumidur | "Sumidur | "Sumidur | "Sumidur |

TABLE 3-continued

| | | | | |
|---|---|---|---|---|
| functional group other than polymerizable unsaturated group and containing no polymerizable unsaturated group | N3300" | N3300" | N3300" | N3300" |
| Compound (x11) containing second reactive functional group and polymerizable unsaturated group | 4-Hydroxybutyl acrylate | 4-Hydroxybutyl acrylate | 4-Hydroxybutyl acrylate | 4-Hydroxybutyl acrylate |
| Compound (y1) containing second reactive functional group | 4-Hydroxybutyl acrylate | 4-Hydroxybutyl acrylate | 4-Hydroxybutyl acrylate | 4-Hydroxybutyl acrylate |
| Compound (y2) containing first reactive fictional group and containing no polymerizable unsaturated group | — | — | — | — |
| Evaluation   Interlayer adhesion | ◉ | ◉ | ◉ | ◉ |
| Weather resistance | ○ | ○ | ○ | ○ |

| | Examples | | | |
|---|---|---|---|---|
| | 18 | 19 | 20 | 21 |
| Molded Base Material Name | (S-1) | (S-1) | (S-1) | (S-1) |
| First In-Mold Coating Material Composition (X) No. | (X-18) | (X-19) | (X-20) | (X-21) |
| Second In-Mold Coating Material Composition (Y) No. | (Y-1) | (Y-1) | (Y-1) | (Y-1) |
| Third In-Mold Coating Material Composition (Z) No. | — | — | — | — |
| First reactive functional group | Isocyanate group | Isocyanate group | Isocyanate group | Isocyanate group |
| Second reactive functional group | Hydroxyl group | Hydroxyl group | Hydroxyl group | Hydroxyl group |
| Compound (x2) containing first reactive functional group other than polymerizable unsaturated group and containing no polymerizable unsaturated group | "Sumidur N3300" | "Sumidur N3300" | "Sumidur N3300" | "Sumidur N3300" |
| Compound (x11) containing second reactive functional group and polymerizable unsaturated group | 4-Hydroxybutyl acrylate | 4-Hydroxybutyl acrylate | 4-Hydroxybutyl acrylate | 4-Hydroxybutyl acrylate |
| Compound (y1) containing second reactive functional group | 4-Hydroxybutyl acrylate | 4-Hydroxybutyl acrylate | 4-Hydroxybutyl acrylate | 4-Hydroxybutyl acrylate |
| Compound (y2) containing first reactive fictional group and containing no polymerizable unsaturated group | — | — | — | — |
| Evaluation   Interlayer adhesion | ◉ | ◉ | ◉ | ◉ |
| Weather resistance | ○ | ○ | ○ | ○ |

| | Examples | | |
|---|---|---|---|
| | 22 | 23 | 24 |
| Molded Base Material Name | (S-1) | (S-1) | (S-1) |
| First In-Mold Coating Material Composition (X) No. | (X-1) | (X-1) | (X-1) |
| Second In-Mold Coating Material Composition (Y) No. | (Y-2) | (Y-3) | (Y-4) |
| Third In-Mold Coating Material Composition (Z) No. | — | — | — |
| First reactive functional group | Isocyanate group | Isocyanate group | Isocyanate group |
| Second reactive functional group | Hydroxyl group | Hydroxyl group | Hydroxyl group |
| Compound (x2) containing first reactive functional group other than polymerizable unsaturated group and containing no polymerizable unsaturated group | "Sumidur N3300" | "Sumidur N3300" | "Sumidur N3300" |
| Compound (x11) containing second reactive functional group and polymerizable unsaturated group | 4-Hydroxybutyl acrylate | 4-Hydroxybutyl acrylate | 4-Hydroxybutyl acrylate |
| Compound (y1) containing second reactive functional group | 2-Hydroxyethyl acrylate | 4-Hydroxybutyl acrylate | "Desmophen XP 2488"/benzyl alcohol |
| Compound (y2) containing first reactive fictional group and containing no polymerizable unsaturated group | — | — | "Sumidur N3300" |
| Evaluation   Interlayer adhesion | ○ | ◉ | ◉ |
| Weather resistance | ○ | ○ | ◉ |

| | Examples | | | |
|---|---|---|---|---|
| | 25 | 26 | 27 | 28 |
| Molded Base Material Name | (S-1) | (S-1) | (S-1) | (S-1) |
| First In-Mold Coating Material Composition (X) No. | (X-2) | (X-3) | (X-4) | (X-5) |
| Second In-Mold Coating Material Composition (Y) No. | (Y-4) | (Y-4) | (Y-4) | (Y-4) |

TABLE 3-continued

| Third In-Mold Coating Material Composition (Z) No. | — | — | — | — |
|---|---|---|---|---|
| First reactive functional group | Isocyanate group | Isocyanate group | Isocyanate group | Isocyanate group |
| Second reactive functional group | Hydroxyl group | Hydroxyl group | Hydroxyl group | Hydroxyl group |
| Compound (x2) containing first reactive functional group other than polymerizable unsaturated group and containing no polymerizable unsaturated group | "Sumidur N3300" | "Desmodur N3400" | "Desmodur N3900" | "Sumidur N3300" |
| Compound (x11) containing second reactive functional group and polymerizable unsaturated group | 4-Hydroxybutyl acrylate | 4-Hydroxybutyl acrylate | 4-Hydroxybutyl acrylate | 4-Hydroxybutyl acrylate |
| Compound (y1) containing second reactive functional group | "Desmophen XP 2488"/benzyl alcohol | "Desmophen XP 2488"/benzyl alcohol | "Desmophen XP 2488"/benzyl alcohol | "Desmophen XP 2488"/benzyl alcohol |
| Compound (y2) containing first reactive fictional group and containing no polymerizable unsaturated group functional group | "Sumidur N3300" | "Sumidur N3300" | "Sumidur N3300" | "Sumidur N3300" |
| Evaluation  Interlayer adhesion | ⊚ | ⊚ | ⊚ | ○ |
| Weather resistance | ⊚ | ⊚ | ⊚ | ⊚ |

| | Examples | | |
|---|---|---|---|
| | 29 | 30 | 31 |
| Molded Base Material Name | (S-1) | (S-1) | (S-1) |
| First In-Mold Coating Material Composition (X) No. | (X-6) | (X-7) | (X-8) |
| Second In-Mold Coating Material Composition (Y) No. | (Y-4) | (Y-4) | (Y-4) |
| Third In-Mold Coating Material Composition (Z) No. | — | — | — |
| First reactive functional group | Isocyanate group | Isocyanate group | Isocyanate group |
| Second reactive functional group | Hydroxyl group | Hydroxyl group | Hydroxyl group |
| Compound (x2) containing first reactive functional group other than polymerizable unsaturated group and containing no polymerizable unsaturated group | "Sumidur N3300" | "Sumidur N3300" | "Sumidur N3300" |
| Compound (x11) containing second reactive functional group and polymerizable unsaturated group | 4-Hydroxybutyl acrylate | 4-Hydroxybutyl acrylate | 4-Hydroxybutyl acrylate |
| Compound (y1) containing second reactive functional group | "Desmophen XP 2488"/benzyl alcohol | "Desmophen XP 2488"/benzyl alcohol | "Desmophen XP 2488"/benzyl alcohol |
| Compound (y2) containing first reactive fictional group and containing no polymerizable unsaturated group functional group | "Sumidur N3300" | "Sumidur N3300" | "Sumidur N3300" |
| Evaluation  Interlayer adhesion | ⊚ | ⊚ | ⊚ |
| Weather resistance | ⊚ | ⊚ | ⊚ |

| | Examples | | | |
|---|---|---|---|---|
| | 32 | 33 | 34 | 35 |
| Molded Base Material Name | (S-1) | (S-1) | (S-1) | (S-1) |
| First In-Mold Coating Material Composition (X) No. | (X-9) | (X-10) | (X-11) | (X-12) |
| Second In-Mold Coating Material Composition (Y) No. | (Y-4) | (Y-4) | (Y-4) | (Y-4) |
| Third In-Mold Coating Material Composition (Z) No. | — | — | — | — |
| First reactive functional group | Isocyanate group | Isocyanate group | Isocyanate group | Isocyanate group |
| Second reactive functional group | Hydroxyl group | Hydroxyl group | Hydroxyl group | Hydroxyl group |
| Compound (x2) containing first reactive functional group other than polymerizable unsaturated group and containing no polymerizable unsaturated group | "Sumidur N3300" | "Sumidur N3300" | "Sumidur N3300" | "Sumidur N3300" |
| Compound (x11) containing second reactive functional group and polymerizable unsaturated group | 2-Hydroxyethyl acrylate | — | 4-Hydroxybutyl acrylate | 4-Hydroxybutyl acrylate |
| Compound (y1) containing second reactive functional group | "Desmophen XP 2488"/benzyl alcohol | "Desmophen XP 2488"/benzyl alcohol | "Desmophen XP 2488"/benzyl alcohol | "Desmophen XP 2488"/benzyl alcohol |
| Compound (y2) containing first reactive fictional group and containing no polymerizable unsaturated group | "Sumidur N3300" | "Sumidur N3300" | "Sumidur N3300" | "Sumidur N3300" |
| Evaluation  Interlayer adhesion | ⊚ | ○ | ○ | ⊚ |
| Weather resistance | ⊚ | ⊚ | ⊚ | ⊚ |

TABLE 3-continued

|  | Examples | | | |
|---|---|---|---|---|
|  | 36 | 37 | 38 | 39 |
| Molded Base Material Name | (S-1) | (S-1) | (S-1) | (S-1) |
| First In-Mold Coating Material Composition (X) No. | (X-13) | (X-14) | (X-15) | (X-16) |
| Second In-Mold Coating Material Composition (Y) No. | (Y-4) | (Y-4) | (Y-4) | (Y-4) |
| Third In-Mold Coating Material Composition (Z) No. | — | — | — | — |
| First reactive functional group | Isocyanate group | Isocyanate group | Isocyanate group | Isocyanate group |
| Second reactive functional group | Hydroxyl group | Hydroxyl group | Hydroxyl group | Hydroxyl group |
| Compound (x2) containing first reactive functional group other than polymerizable unsaturated group and containing no polymerizable unsaturated group | "Sumidur N3300" | "Summdur N3300" | "Sumidur N3300" | "Sumidur N3300" |
| Compound (x11) containing second reactive functional group and polymerizable unsaturated group | 4-Hydroxybutyl acrylate | 4-Hydroxybutyl acrylate | 4-Hydroxybutyl acrylate | 4-Hydroxybutyl acrylate |
| Compound (y1) containing second reactive functional group | "Desmophen XP 2488"/benzyl alcohol | "Desmophen XP 2488"/benzyl alcohol | "Desmophen XP 2488"/benzyl alcohol | "Desmophen XP 2488"/benzyl alcohol |
| Compound (y2) containing first reactive fictional group and containing no polymerizable unsaturated group | "Sumidur N3300" | "Sumidur N3300" | "Sumidur N3300" | "Sumidur N3300" |
| Evaluation  Interlayer adhesion | ⊚ | ⊚ | ⊚ | ⊚ |
| Weather resistance | ⊚ | ○ | ⊚ | ⊚ |

|  | Examples | | | |
|---|---|---|---|---|
|  | 40 | 41 | 42 | 43 |
| Molded Base Material Name | (S-1) | (S-1) | (S-1) | (S-1) |
| First In-Mold Coating Material Composition (X) No. | (X-17) | (X-18) | (X-19) | (X-20) |
| Second In-Mold Coating Material Composition (Y) No. | (Y-4) | (Y-4) | (Y-4) | (Y-4) |
| Third In-Mold Coating Material Composition (Z) No. | — | — | — | — |
| First reactive functional group | Isocyanate group | Isocyanate group | Isocyanate group | Isocyanate group |
| Second reactive functional group | Hydroxyl group | Hydroxyl group | Hydroxyl group | Hydroxyl group |
| Compound (x2) containing first reactive functional group other than polymerizable unsaturated group and containing no polymerizable unsaturated group | "Sumidur N3300" | "Sumidur N3300" | "Sumidur N3300" | "Sumidur N3300" |
| Compound (x11) containing second reactive functional group and polymerizable unsaturated group | 4-Hydroxybutyl acrylate | 4-Hydroxybutyl acrylate | 4-Hydroxybutyl acrylate | 4-Hydroxybutyl acrylate |
| Compound (y1) containing second reactive functional group | "Desmophen XP 2488"/benzyl alcohol | "Desmophen XP 2488"/benzyl alcohol | "Desmophen XP 2488"/benzyl alcohol | "Desmophen XP 2488"/benzyl alcohol |
| Compound (y2) containing first reactive fictional group and containing no polymerizable unsaturated group | "Sumidar N3300" | "Sumidur N3300" | "Sumidur N3300" | "Sumidur N3300" |
| Evaluation  Interlayer adhesion | ⊚ | ⊚ | ⊚ | ⊚ |
| Weather resistance | ⊚ | ⊚ | ⊚ | ○ |

|  | Examples | | | |
|---|---|---|---|---|
|  | 44 | 45 | 46 | 47 |
| Molded Base Material Name | (S-1) | (S-1) | (S-1) | (S-1) |
| First In-Mold Coating Material Composition (X) No. | (X-21) | (X-1) | (X-1) | (X-1) |
| Second In-Mold Coating Material Composition (Y) No. | (Y-4) | (Y-5) | (Y-6) | (Y-7) |
| Third In-Mold Coating Material Composition (Z) No. | — | — | — | — |
| First reactive functional group | Isocyanate group | Isocyanate group | Isocyanate group | Isocyanate group |
| Second reactive functional group | Hydroxyl group | Hydroxyl group | Amino group | Amino group |
| Compound (x2) containing first reactive functional group other than polymerizable unsaturated group and containing no polymerizable unsaturated group | "Sumidur N3300" | "Sumidur N3300" | "Sumidur N3300" | "Sumidur N3300" |
| Compound (x11) containing second reactive functional group and polymerizable unsaturated group | 4-Hydroxybutyl acrylate | 4-Hydroxybutyl acrylate | 4-Hydroxybutyl acrylate | 4-Hydroxybutyl acrylate |

TABLE 3-continued

|  |  |  |  |  |
|---|---|---|---|---|
| Compound (y1) containing second reactive functional group | "Desmophen XP 2488"/benzyl alcohol | "Desmophon XP 2488"/ "Desmophen VPLS 2249/1"/ benzyl alcohol | "Desmophon NH 1420" | "Desmophon NH 1220" |
| Compound (y2) containing first reactive fictional group and containing no polymerizable unsaturated group | "Sumidur N3300" | "Sumidur N3300" | "Sumidur N3300" | "Sumidur N3300" |
| Evaluation Interlayer adhesion | ⊚ | ⊚ | ○ | ○ |
| Weather resistance | ⊚ | ⊚ | ○ | ○ |

| | Examples | | | |
|---|---|---|---|---|
| | 48 | 49 | 50 | 51 |
| Molded Base Material Name | (S-1) | (S-1) | (S-2) | (S-1) |
| First In-Mold Coating Material Composition (X) No. | (X-22) | (X-1) | (X-1) | (X-1) |
| Second In-Mold Coating Material Composition (Y) No. | (Y-6) | (Y-8) | (Y-4) | (Y-1) |
| Third In-Mold Coating Material Composition (Z) No. | — | — | — | (Z-1) |
| First reactive functional group | Isocyanate group | Isocyanate group | Isocyanate group | Isocyanate group |
| Second reactive functional group | Amino group | Hydroxyl group | Hydroxyl group | Hydroxyl group |
| Compound (x2) containing first reactive functional group other than polymerizable unsaturated group and containing no polymerizable unsaturated group | "jER-828" | "Sumidur N3300" | "Sumidur N3300" | "Sumidur N3300" |
| Compound (x11) containing second reactive functional group and polymerizable unsaturated group | — | 4-Hydroxybutyl acrylate | 4-Hydroxybutyl acrylate | 4-Hydroxybutyl acrylate |
| Compound (y1) containing second reactive functional group | "Desmopben NH 1420" | "Desmophen XP 2488"/benzyl alcohol | "Desmophen XP 2488"/benzyl alcohol | 4-Hydroxybutyl acrylate |
| Compound (y2) containing first reactive fictional group and containing no polymerizable unsaturated group | — | "Sumidur N3300" | "Sumidur N3300" | — |
| Evaluation Interlayer adhesion | ○ | ⊚ | ⊚ | ⊚ |
| Weather resistance | ○ | ⊚ | ⊚ | ⊚ |

| | Examples | | | |
|---|---|---|---|---|
| | 52 | 53 | 54 | 55 |
| Molded Base Material Name | (S-1) | (S-1) | (S-1) | (S-2) |
| First In-Mold Coating Material Composition (X) No. | (X-1) | (X-1) | (X-1) | (X-1) |
| Second In-Mold Coating Material Composition (Y) No. | (Y-4) | (Y-1) | (Y-4) | (Y-4) |
| Third In-Mold Coating Material Composition (Z) No. | (Z-2) | (Z-2) | (Z-1) | (Z-1) |
| First reactive functional group | Isocyanate group | Isocyanate group | Isocyanate group | Isocyanate group |
| Second reactive functional group | Hydroxyl group | Hydroxyl group | Hydroxyl group | Hydroxyl group |
| Compound (x2) containing first reactive functional group other than polymerizable unsaturated group and containing no polymerizable unsaturated group | "Sumidur N3300" | "Sumidur N3300" | "Sumidur N3300" | "Sumidur N3300" |
| Compound (x11) containing second reactive functional group and polymerizable unsaturated group | 4-Hydroxybutyl acrylate | 4-Hydroxybutyl acrylate | 4-Hydroxybutyl acrylate | 4-Hydroxybutyl acrylate |
| Compound (y1) containing second reactive functional group | "Desmophen XP 2488"/benzyl alcohol | 4-Hydroxybutyl acrylate | "Desmophen XP 2488"/benzyl alcohol | "Desmopben XP 2488"/benzyl alcohol |
| Compound (y2) containing first reactive fictional group and containing no polymerizable unsaturated group | "Sumidur N3300" | — | "Sumidur N3300" | "Sumidur N3300" |
| Evaluation Interlayer adhesion | ⊚ | ⊚ | ⊚ | ⊚ |
| Weather resistance | ⊚ | ⊚ | ⊚ | ⊚ |

| | Comparative Examples | | | | | | | | | |
|---|---|---|---|---|---|---|---|---|---|---|
| | 1 | 2 | 3 | 4 | 5 | 6 | 7 | 8 | 9 | 10 |
| Molded Base Material Name | (S-1) | (S-1) | (S-1) | (S-2) | (S-1) | (S-1) | (S-1) | (S-2) | (S-1) | (S-2) |
| First In-Mold Coating Material Composition (X) No. | (X-23) | (X-23) | (X-1) | (X-23) | (X-23) | (X-23) | (X-1) | (X-23) | (X-1) | (X-1) |
| Second In-Mold Coating Material Composition (Y) No. | (Y-1) | (Y-4) | (Y-9) | (Y-4) | (Y-1) | (Y-4) | (Y-9) | (Y-4) | — | — |
| Third In-Mold Coating Material Composition (Z) No. | — | — | — | — | (Z-1) | (Z-1) | (Z-1) | (Z-1) | — | — |
| First reactive functional group | — | — | — | — | — | — | — | — | — | — |
| Second reactive functional group | — | — | — | — | — | — | — | — | — | — |
| Compound (x2) containing first reactive functional group | — | — | — | — | — | — | — | — | — | — |

TABLE 3-continued

| | | | | | | | | | | | |
|---|---|---|---|---|---|---|---|---|---|---|---|
| other than polymerizable unsaturated group and containing no polymerizable unsaturated group | | | | | | | | | | | |
| Compound (x11) containing second reactive functional group and polymerizable unsaturated group | | — | — | — | — | — | — | — | — | — | — |
| Compound (y1) containing second reactive functional group | — | — | — | — | — | — | — | — | — | — | |
| Compound (y2) containing first reactive functional group and containing no polymerizable unsaturated group | — | — | — | — | — | — | — | — | — | — | |
| Evaluation | Interlayer adhesion | X | X | X | X | X | X | X | X | X | X |
| | Weather resistance | X | X | ○ | X | X | X | ◎ | ○ | X | X |

The invention claimed is:

1. A method of forming an in-mold coated multi-layer coating film, the method comprising:
    step (1): forming an uncured first in-mold coating film by injecting a first in-mold coating composition (X) between a molded base material and an inner wall of a first film-coating-mold, the first in-mold coating composition (X) containing a polymerizable unsaturated group-containing compound (x1) containing a polymerizable unsaturated group, and a compound (x2) containing a first reactive functional group other than a polymerizable unsaturated group and containing no polymerizable unsaturated group;
    step (2): heating the uncured first in-mold coating film to thereby cure the uncured first in-mold coating film and form a cured first in-mold coating film;
    step (3): separating the first film-coating-mold from a surface of the cured first in-mold coating film;
    step (4): providing a gap between the surface of the cured first in-mold coating film and a second film-coating-mold;
    step (5): forming an uncured second in-mold coating film by injecting a second in-mold coating composition (Y) between the surface of the cured first in-mold coating film and an inner wall of the second film-coating-mold, the second in-mold coating composition (Y) containing a compound (y1) containing a second reactive functional group capable of reacting with the first reactive functional group; and
    step (6): heating and curing the uncured second in-mold coating film, wherein
    the second film-coating-mold is the same as or different from the first film-coating-mold.

2. The method of forming the in-mold coated multi-layer coating film according to claim 1, wherein the polymerizable unsaturated group-containing compound (x1) contains a compound (x11) containing the polymerizable unsaturated group and the second reactive functional group.

3. The method of forming the in-mold coated multi-layer coating film according to claim 1, wherein the polymerizable unsaturated group-containing compound (x1) contains a vinyl aromatic compound (x12).

4. The method of forming the in-mold coated multi-layer coating film according to claim 3, wherein the polymerizable unsaturated group-containing compound (x1) contains the vinyl aromatic compound (x12) in an amount in a range from 20 to 91 mass % based on the content of the polymerizable unsaturated group-containing compound (x1).

5. The method of forming the in-mold coated multi-layer coating film according to claim 1, wherein the first reactive functional group contains an isocyanate group.

6. The method of forming the in-mold coated multi-layer coating film according to claim 1, wherein the second reactive functional group contains a hydroxyl group.

7. The method of forming the in-mold coated multi-layer coating film according to claim 1, wherein the second in-mold coating composition (Y) contains a compound (y2) containing the first reactive functional group and containing no polymerizable unsaturated group.

* * * * *